United States Patent
Combs

(10) Patent No.: US 7,603,305 B2
(45) Date of Patent: Oct. 13, 2009

(54) COMBINED LOAN AND INVESTMENT SYSTEM AND METHOD

(76) Inventor: Richard T. Combs, 880 Squire Lakes, Villa Hills, KY (US) 41017

( * ) Notice: Subject to any disclaimer, the term of this patent is extended or adjusted under 35 U.S.C. 154(b) by 389 days.

(21) Appl. No.: 11/186,613

(22) Filed: Jul. 21, 2005

(65) Prior Publication Data

US 2006/0020532 A1    Jan. 26, 2006

Related U.S. Application Data

(60) Provisional application No. 60/589,773, filed on Jul. 21, 2004.

(51) Int. Cl.
*G06Q 40/00* (2006.01)
(52) U.S. Cl. .................. 705/35; 705/36 R; 705/38
(58) Field of Classification Search ................ None
See application file for complete search history.

(56) References Cited

U.S. PATENT DOCUMENTS

| | | | | |
|---|---|---|---|---|
| 4,876,648 | A * | 10/1989 | Lloyd | 705/38 |
| 4,953,085 | A * | 8/1990 | Atkins | 705/36 R |
| 5,704,045 | A * | 12/1997 | King et al. | 705/35 |
| 5,819,230 | A * | 10/1998 | Christie et al. | 705/36 T |
| 5,991,744 | A * | 11/1999 | DiCresce | 705/36 R |
| 7,447,663 | B1 * | 11/2008 | Barker et al. | 705/78 |
| 2002/0091610 | A1 * | 7/2002 | Smith | 705/36 |
| 2004/0088247 | A1 * | 5/2004 | Grant et al. | 705/38 |
| 2004/0088248 | A1 * | 5/2004 | Cutler | 705/38 |
| 2004/0254878 | A1 * | 12/2004 | Fitzsimmons et al. | 705/38 |

OTHER PUBLICATIONS

The variable universal mortgage: A product whose time has come, Ed Morrow, Financial Services Advisor, Lexington: May/Jun. 2000. vol. 143, Iss. 3; p. 19 (3 pages).*

Fannie Mae begins jumbo underwriting, Ed Staples, Real Estate Finance Today, Washington: Sep. 16, 1996. vol. 13, Iss. 18; p. 12 (2 pages).*

(Continued)

*Primary Examiner*—Alexander Kalinowski
*Assistant Examiner*—Gregory Johnson
(74) *Attorney, Agent, or Firm*—Wood, Herron & Evans

(57) ABSTRACT

A combined loan and investment program comprises a computer processor and program code configured to be executed by the computer processor to process financial loan and investment data by calculating from the data interest and principal loan payments on a loan principal at a given rate and term, calculating investment performance data on a periodic principal investment deposit at a given rate and calculating loan principal amortization parameters as a function of the investment performance data. The present invention provides a method for paying off a mortgage and simultaneously generating wealth via an investment account by making a payment to a mortgagee, dividing the payment, applying a first portion of the payment to satisfy the interest due on the mortgage, applying a second portion of the payment to an investment account, allowing the investment account to grow and applying a portion of the investment account to satisfy the mortgage.

21 Claims, 1 Drawing Sheet

OTHER PUBLICATIONS

Mortgage models, interest rate risk, and the consumer: A four country comparison, Soula Proxenos, L G Taff. Housing Finance International. London: Mar. 2003. vol. 17, Iss. 3; p. 14 (10 pages).*

Super v Salary, Bartlett, Steve. Australian Accountant. Jul. 1991. vol. 61, Iss. 6; p. 39 (3 pages).*

Fun with figures: can you make a profit on your mortgage?, Canadian Business. Toronto: Jul. 1983. vol. 56, Iss. 7; pp. 1-2.*

Add-On Product to Encourage Savings Is Patented, Mortgage Marketplace, Bethesda: May 10, 1999. vol. 22, Iss. 19; p. 1.*

* cited by examiner

COMBINED LOAN AND INVESTMENT SYSTEM AND METHOD

RELATED APPLICATION

This application is related to Application 60/589,773 filed Jul. 21, 2004 entitled MORTGAGE ACCELERATION PRODUCTS AND METHODS now pending.

FIELD OF THE INVENTION

The present invention relates to the financial systems and methods and more particularly to a system and method for simultaneously generating wealth while satisfying the interest obligations of a loan.

BACKGROUND OF THE INVENTION

Purchasing a home can be one of the most important financial goals of any consumer. A consumer's home can be one of their largest investments. The number of consumers utilizing a conventional mortgage loan to purchase a home or property, payoff debt, or make improvements increase annually. The average consumer tries to minimize their payment by amortizing over extended periods. Many lenders offer amortization periods for terms of ten, fifteen, thirty, or even forty years. The shorter the amortization schedule, the larger the payment is required. A conventional loan payment requires both principal and interest amounts to be paid as part of each payment. The amount of the conventional loan payment stays the same over the amortized period. The principal payments reduce the loan value, thus decreasing the amount of loan interest paid in subsequent payments. The reduction in the loan balance only occurs from additional principal payments. The equity value increases as the amount of the loan decreases. The equity does not generate any return. The positive growth in value of a property from market appreciation is calculated on the value of the property not the equity. The total out of pocket costs for a conventional loan with a loan rate greater than zero percent are always greater than the face amount of the loan.

Rising home prices are forcing consumers to allocate larger percentages of earned income towards housing. More and more consumers are required to have two incomes to afford a home. Home buyers are paying premiums for properties in attractive areas as housing markets continue to appreciate. Many consumers make a mortgage payment that represents a large percentage of their net income. This strain on the household budget results in rising bankruptcy rates. Finding suitable amounts of disposable income needed to allocate for long term financial goals challenges consumers. With the rising costs of goods and services many consumers are falling short or not adequately meeting their investment goals. The consumer needs control, choices, and flexibility before the housing market reaches a level that puts the dream of owning a home out of reach for the average consumer.

Lending institutions find themselves in a competitive market place. Consumers routinely make loan decisions based primarily on minimizing the current interest rate on their loan. The level of consumer loyalty continues to diminish. As rates decline the volume of loan refinancing increases, therefore the industry is faced with positioning laws prohibiting abusive refinancing arrangements. Lending institutions are faced with many risks. Institutions deal with risks of default, declining property values, interest rate risks, declining fee income from mortgage interest over time and the risk of pricing loans so they are not competitive.

OBJECTS OF THE INVENTION

Accordingly, it is an object of the invention to provide a system for enhancing the financial condition of a borrower.

Another objective of the invention is to increase financial status of a home buyer through home purchase, where the increase is a function of equity growth apart from real estate appreciation.

Another objective of the invention is to enable a home buyer to purchase a home under more favorable long term performance of the financing agreements than exist in a traditional mortgage arrangement.

Another objective is to provide lenders with a financial tool to reduce refinancing frequency, to increase consumer loyalty, to reduce risks such as default, declining property value, interest rate risk, declining fee income from mortgage interest payments over time, and non-competitive loan pricing.

The above and other objects and advantages of the present invention shall be made apparent from the accompanying drawings and the brief description thereof.

SUMMARY OF THE INVENTION

The present invention provides for a system that merges lending and investing concepts together to provide a method for consumers and lenders to achieve desirable results by allowing a consumer to continue to make the same monthly payments that are required from a conventional loan and market rates. By adding additional principal, systematically or as a lump sum, the investment objectives will be accelerated. For example, the system can accelerate the time period required to payoff a loan, create income from existing equity, be a wealth builder, allow consumers to maximize the value of a property, or enable a borrower to make declining payments over time. The system provides maximum benefit by allowing the consumer to take control of the investment of the principal otherwise applied to the pay down of a conventional loan balance. However, a conventional loan can be used in the system by using an additional systematic or lump sum investment amount in addition to the conventional loan payment.

The present invention can allow a consumer to make one payment, comprised of a loan and an investment component, or can accommodate separation of the loan investment component. The loan component services the debt obligation. The investment component allows the consumer to have the flexibility to apply payments toward principal. The payment can be an amount applied towards the reduction of the loan amount or be applied to an investment account. The investment amounts may be applied to a variety of options that allow for systematic and lump sum investment. Consolidating lending and investment components allows the consumer to use an easy and flexible vehicle to achieve a variety of financial goals. The institution that provides the product benefits from the fee income from both the loan and investment activity. The institution has the flexibility of selecting and customizing prudent investment options.

The present invention can offer a variety of investment options that fit the objectives and the time horizon of the consumer. The system can allow for a self directed investment selection or investments selected by the managing institution. The investment options can include individual securities, managed funds or sub-accounts, and fixed rate investments. These funds or sub-account choices can be provided through a single or multiple investment managers. The selection of investment options can include choices in all investment categories. A selection of funds can be made available through asset allocation models or individual fund choices can be made available to offer flexibility and diversification. A fixed account option can be made available for short term or conservative investment goals. A fixed rate option can include an investment for specific time periods at a fixed interest rate. Upon maturity of the fixed rate investment the consumer can select another fixed term or choose another investment option. The fixed rate investment can be used to dollar cost average into the variable investments to average the price of the investment over time.

In certain interest rate or market environments a defensive position may be beneficial. Hedging strategies can offset adverse rate or market conditions minimizing worst case scenarios. Hedging can lessen the effects of a sudden rise in interest rates or a decline in market value.

The systematic investment amount can be based on the calculation of a conventional loan payment at any given term and current market rate less the interest only loan payment. If a conventional loan were used as an alternative lending source an additional systematic or lump sum investment would potentially be needed to achieve desired results. The system can offer the flexibility of reducing the amount of the systematic investment. A smaller systematic investment amount or no systematic investment would be necessary if a suitable lump sum investment was invested. Once the principal value accumulates to a suitable level to produce the compound interest necessary to achieve one's goal the systematic investment can be reduced. The time period to achieve the desired results is extended if the investment is under funded by systematic or lump sum investments, withdrawals reduce the principal value below a sustainable level, or the investment return is under the anticipated rate.

As the investment value accumulates, the system can allow the managing institution to treat the investment value as collateral. For example, the institution may receive a security interest in the investment value or account or it may restrict access to the investment value until a required value is reached. This value may be calculated as a percentage of the market value of the property pledged as collateral. Further restrictions can be placed to limit the reduction in the systematic investment amounts until the investment account equals a predetermined value. Additional restrictions placed on withdrawals could be used to help determine the success of the consumers goal. Exceptions could be available to allow dividends, interest, or systematic withdraws to be used for income needs. If a consumer's goal is income, restrictions may be placed on the investment value from dropping below a certain value. These restrictions can offer the lending institution a level of protection by requiring the investment to be used as collateral in addition to the property. The assignment allows lending institutions to have protection in markets that experience declining property values.

As the investment value increases the product can allow the interest, dividends, or systematic withdrawals to make the scheduled interest only loan payment. The growth of the investment value will be determined by the amount, frequency, and duration of the systematic or lump sum investment, as well as the rate of return on the investment value. Of course, the greater the rate of return and/or the amount of the principal applied, the sooner the investment value will be able to make the scheduled interest only loan payment.

The lending component of the system can offer a proprietary lending relationship with a single lending institution or offer a choice of multiple lenders. Multiple lenders offer the consumer the ability to take advantage of competition. The competition would offer to the consumer the best loan rate and benefits available in the marketplace. The availability of conventional or interest only loan options offer flexibility and gives consumers the potential to maximize their goals.

The present invention can offer tools to the consumer to make better decisions for financial success. Tools offered can be a mortgage amortization calculator, an analysis tool comparing the total cost between payments of a conventional and interest only loan option, and a hypothetical calculator analyzing systematic and lump sum investments. The investment calculator would compare investment rates for set amounts, frequencies, and durations. The calculator can allow for past performance of actual investments to be used to illustrate the performance of the investment component. An investment hypothetical can provide perspective to the type of investment needed to achieve a desired goal. Additional information can be provided such as the rate history of mortgage indices, a history of rates of return of investment indices, a calculator to illustrate the results of the system based upon the amount borrowed, the interest rate charged on the loan, the amount invested, the frequency and duration of the investment, and the interest rate earned on the investment.

The present invention can further comprise software to track activity, educate, and provide hypothetical illustrations. Tables can be provided to track loan and investment activity. The activity tracked could be payment amounts, rates, frequencies, loan balance, price per share, quantity of shares, investment value, and total out of pocket costs. As part of the educational component, testimonials can be provided to show real life examples of the use of the system. Additionally, historical data can be supplied to show past rates of return of investment indices and historical rates on interest only and conventional loan products. Definitions of key terms, words and phrases can also provide education. A tutorial can provide examples to illustrate each goal and the features of the system. Hypothetical illustrations can offer a mathematical projection based upon systematic and lump sum investments or withdraws for specified time periods at given interest rates. The consumer can view the projected results of the investment and loan component compared to a conventional loan. The results can illustrate the time period required to payoff a loan based upon the amount and duration of the payment activity, show amounts available for systematic withdraw, total out of pocket costs, and the value of the investment component for any given duration. Calculations will show a comparison of the total out of pocket costs between the system and a conventional loan. Illustrations can also be provided to show the values of the investment, loan balance and interest payments of the loan if the program were continued beyond the time period by which the investment value equals the loan balance.

The software can give an institution the flexibility to run illustrations at the point of sale. Fixed investment rates, past performance of investment indices, mutual fund past performance, or a combination of investment options can be used to illustrate the systematic and lump sum investment or withdraw activity for any specified duration, frequency, and investment amount. The illustration can also use various loan rates, balances, and loan types. Tools provided can include a mortgage amortization calculator, a calculator to determine the amount of a loan afforded based upon income and expenses, a cost analysis of using the system versus conventional loans, and hypothetical illustrations based on loan and investment activity. Institutions may want to use proprietary products exclusively or may elect to use additional outside relationships for either lending or investment alternatives. The software can make available a consolidated statement that merges information from mortgage and investment activity together on one statement. The consumer would benefit by being able to make a single payment. The consolidated statement can show the amount of a scheduled mortgage payment due, the principal balance of the loan outstanding, the current interest rate on the loan, a listing of investment options selected, investment activity for the period, and the current quantity and value of investments owned.

The present invention can be embodied in computers and in software and includes methods of obtaining the benefits described.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION OF THE INVENTION

Figure 1:
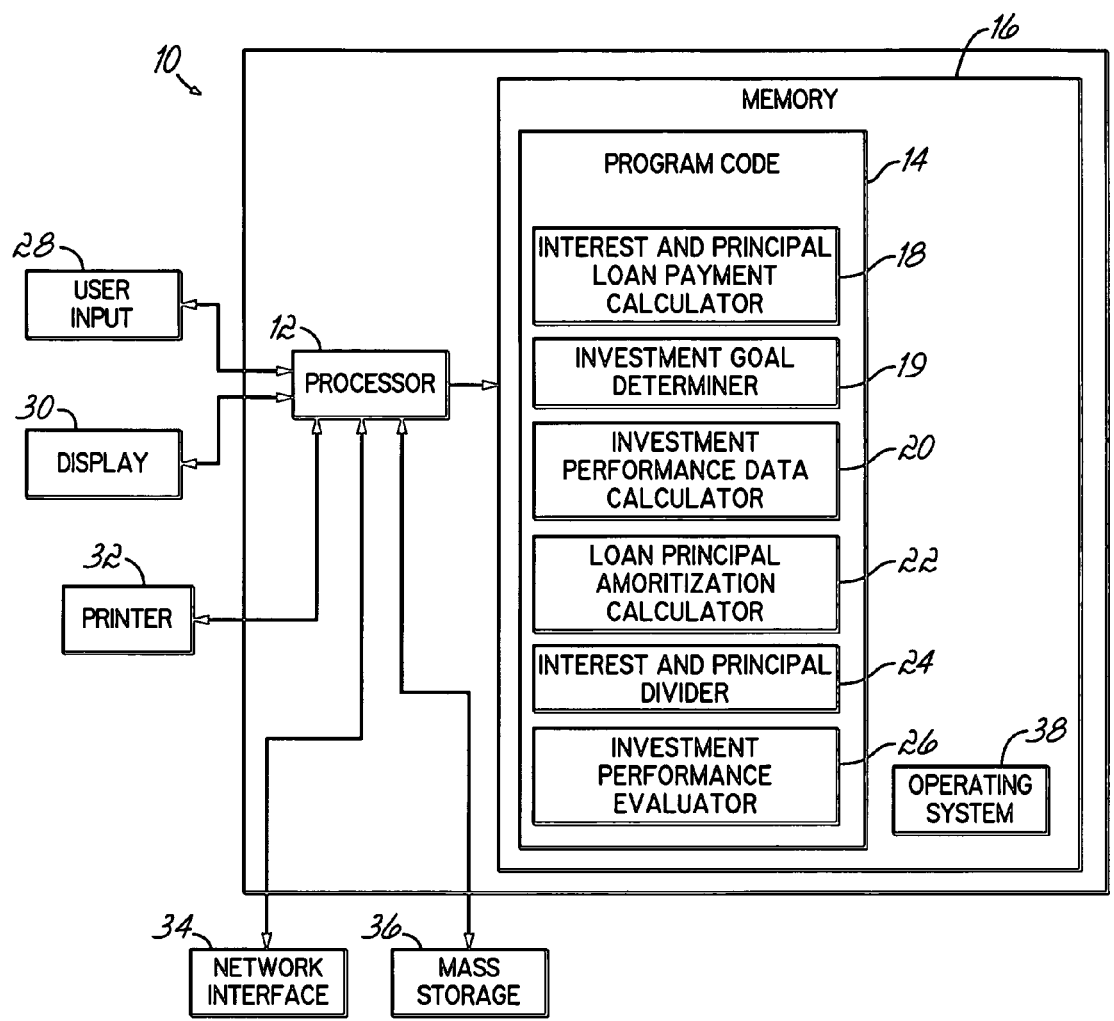
FIG. 1 is a block diagram of the present invention.

Referring to the figures and specifically to FIG. 1, the data processing system 10 for managing a combined loan and investment program preferably comprises a computer processor 12 and program code 14 stored within the memory 16 of the data processing system 10. The computer readable program code 14 is configured to be executed by the computer processor 12 to process financial loan and investment data by calculating from the data interest and principal loan payments on a loan principal at a given rate and term. This function is accomplished by an interest and principal and loan payment calculator or program 18. Additionally, the program code contains an investment goal determiner 19 which determines the investment goals a consumer. The program code also contains an investment performance data calculator or program 20 which calculates investment performance data on periodic principal investment deposits at a given rate. Additionally, the computer readable program code 14 contains a loan principal amortization calculator or program 22 which calculates loan principal amortization parameters as a function of the investment performance data.

In an alternative embodiment, the program code 14 may further include an interest and principal divider or program 24 which further processes the financial loan and investment data by dividing the interest and loan payments into an interest satisfaction portion and a principal reduction portion. This program may further allocate the interest satisfaction portion to satisfy the requisite periodic interest payment for the loan and may further allocate at least a portion of the principal reduction portion as the periodic principal investment deposit.

In yet another embodiment of the present invention, the computer readable program code 14 may include an investment performance evaluator or program 26 which evaluates the investment performance data to determine when the loan principal may be reduced from the investment program.

The data processing system 10 may further comprise a user input 28, such as a computer keyboard, mouse, touch pad, touch screen, or like interface, as well as a display 30 which are connected to the processor 12. Additionally, a printer 32 or other like output device may be connected to the processor 12. The processor 12 may also be connected to a network interface providing conductivity in a local area network, or access to the Internet at large. The processor 12 may also be connected to an additional mass storage unit 36 for storing financial loan and investment data. Finally, the data processing system 10 will typically contain an operating system for enabling the interaction of various hardware and software components.

Figure 2:
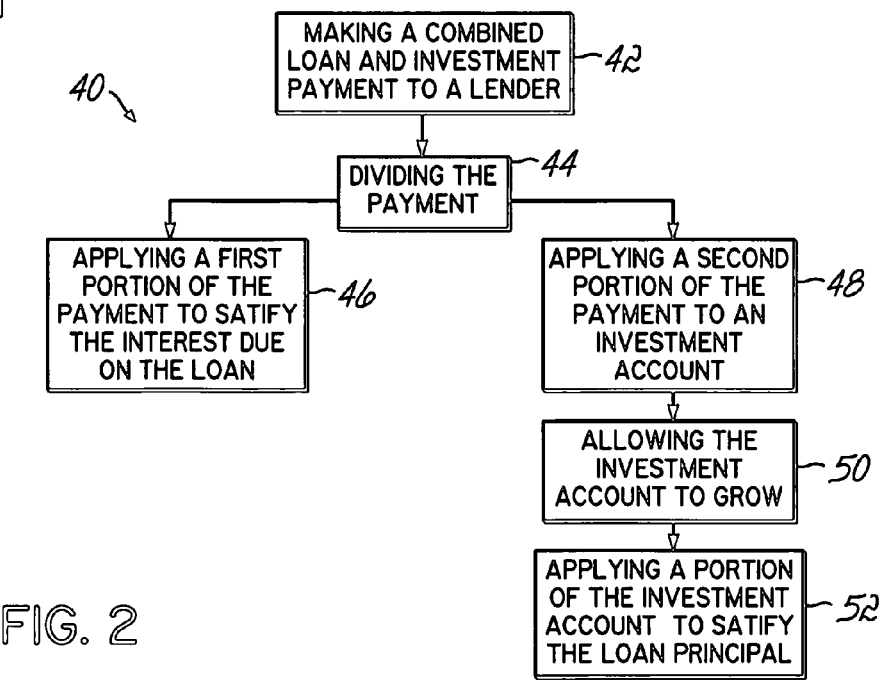
FIG. 2 is a flow chart illustrating the method of the present invention.

Referring to FIG. 2, the method of establishing and using a combined loan and investment system 40 is further illustrated. First, a consumer or borrower/investor, e.g., a mortgagor, makes a combined loan and investment payment to a lender such as a mortgagee (Block 42). The combined loan and investment payment is then divided (Block 44) and a first portion of the payment is applied to satisfy the interest due on the loan (Block 46) and a second portion of the payment is applied to the investment account (Block 48). The investment account is then allowed to grow (Block 50) until sufficient growth and/or principal accumulation occurs that a portion of the investment account may be used to satisfy the loan principal (Block 52).

Using this system gives consumers the ability to achieve a variety of financial goals such as accelerating the payoff of a mortgage, paying for a college education, providing an additional source of income, creating additional net worth, accumulate assets, make the maximum affordable/minimum monthly payment, have a declining minimum monthly payment, or any other long term financial goal that requires the accumulation of wealth. The necessity of making payments in addition to a conventional loan payment is not required, provided the interest rate on the loan allows for a difference between the conventional loan payment and the interest only loan, or there is a lump sum interest earning principal payment that achieves desirable results over the life of the loan. If the principal payments are reduced or the interest rate earned on the principal declines, possible additional principal payment would be required to meet the same objectives. The system empowers the consumer to achieve a variety of financial goals not typically associated with the conventional mortgage loan.

The system empowers the consumer and also allows lending institutions the ability to improve the level of fee income to which they are accustomed. The system offers consumers multiple benefits such as a lower credit score, a level amount of tax deductible interest paid annually, and a unique opportunity to leverage an asset to achieve financial goals. These benefits occur while making a payment less than or equal to a conventional loan payment. The system allows the consumer and lending institution rising protection against default. Consumers will not look at a conventional loan the same way with the flexibility and dramatic financial implications the system provides.

The invention thus comprises a combined mortgage and investment program wherein the mortgage is set up as an interest payment only loan and is additionally secured by an investment account into which periodic payments, which would have been principal payments under a conventional mortgage at similar rates and terms, are deposited. Interest compounds on this investment side of the program so that equity is built on the principal payments, otherwise dormant insofar as producing appreciation. As a result, many advantages to both the lender and consumer occur. Mortgage payments are flat on the mortgage side, yet equity on principal appreciates as well, in addition to, and apart from, any real estate appreciation or depreciation. The ability to pay off the capitalized value of the mortgage over a shorter term than a conventional loan is provided, while much greater flexibility and wealth accumulation is provided for the consumer.

The system works by integrating the two financial concepts of compound interest and interest only loan payments. The system separates the principal payment from the interest payment. The principal payment through the system does not reduce the amount of the loan, but is applied to an investment that earns a rate of return. The consumer chooses any conventional loan amortization period at prevailing market rates to help determine the amount of the total monthly payment. The difference between a conventional loan payment and the interest only loan payment helps determine the amount to be applied towards the investment. The payment with the system can remain the same as a conventional loan payment or be reduced to extend the period of time to achieve the financial results desired. The consumer may be responsible to select the best investment and loan rates available being prudent to choose a realistic time horizon and a proper risk tolerance. The interest rate achieved, the amount of principal applied towards the investment component, and the length of time the money is invested all determine the frequency to achieve a consumer's financial goal. The interest only payment allows the amount allocated to the investment an opportunity to accumulate at any given rate of return. The earnings on the investment value have a net effect of decreasing the interest rate of the loan over time. The higher the rate earned on the investment the faster the principal grows to equal or exceed the original loan balance. The total out of pocket cost equals the total interest paid on the loan plus the total payments to the systematic investment. As the rate of return on the investment increases the result can even have a net effect of reducing the out of pocket costs to below the stated loan value. In addition, the level interest only payment allows for a consistent income tax deduction over the life of the loan.

The Payment Table below illustrates the cost of borrowing versus the time period needed to reach desired principal values at specified interest rates. The Payment Table illustrates a loan amount of $100,000 at an interest only loan rate of 3.125%. The difference between a conventional loan payment of $583.57 and the interest only loan payment of $260.42 equals $323.15 which is an amount eligible for systematic investment. The Payment Table shows the effect of compound interest on systematic investments at various interest rates. In addition, the Payment Table could also be used to illustrate different loan amounts, loan interest rates, different rates of return, and different principal amounts applied to the investment.

PAYMENT TABLE

INVESTMENT PAYMENT CALCULATION

| | |
|---|---|
| Conventional Loan Payment at 5.75% | $583.57 |
| LESS: Interest Only Loan Payment at 3.125% | $260.42 |
| Difference Applied to Investment | $323.15 |

SYSTEMATIC INVESTMENT

| LOAN | $100,000 | | | | | | | | | | | | |
|---|---|---|---|---|---|---|---|---|---|---|---|---|---|
| RATE | 3.125% | | | | | | | | | | | | |
| INV AMT | $323.15 | | | | | | | | | | | | |

| | COST OF BORROWING | | | | | | | | | | | | |
|---|---|---|---|---|---|---|---|---|---|---|---|---|---|
| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
| 1 | $260.42 | $ 260.42 | $323.15 | $ 323.15 | $ 323.42 | $ 323.69 | $ 324.23 | $ 324.50 | $ 324.77 | $ 325.30 | $ 325.84 | $ 326.38 | $ 583.57 |
| 2 | $260.42 | $ 520.83 | $323.15 | $ 646.30 | $ 647.11 | $ 647.92 | $ 649.54 | $ 650.34 | $ 651.16 | $ 652.78 | $ 654.40 | $ 656.03 | $ 1,167.13 |
| 3 | $260.42 | $ 781.25 | $323.15 | $ 969.45 | $ 971.07 | $ 972.69 | $ 975.93 | $ 977.55 | $ 979.18 | $ 982.43 | $ 985.70 | $ 988.97 | $ 1,750.70 |
| 4 | $260.42 | $1,041.67 | $323.15 | $1,292.50 | $1,295.30 | $1,297.99 | $1,303.41 | $1,306.12 | $1,308.84 | $1,314.29 | $1,319.75 | $1,325.24 | $ 2,334.27 |
| 5 | $260.42 | $1,302.08 | $323.15 | $1,615.75 | $1,619.79 | $1,623.85 | $1,631.98 | $1,636.06 | $1,640.15 | $1,648.35 | $1,656.60 | $1,664.87 | $ 2,917.83 |
| 6 | $260.42 | $1,562.50 | $323.15 | $1,938.90 | $1,944.56 | $1,950.24 | $1,961.65 | $1,967.37 | $1,973.11 | $1,984.65 | $1,996.24 | $2,007.90 | $ 3,501.40 |
| 7 | $260.42 | $1,822.92 | $323.15 | $2,262.05 | $2,269.60 | $2,277.18 | $2,292.41 | $2,300.07 | $2,307.75 | $2,323.18 | $2,338.72 | $2,354.36 | $ 4,084.97 |
| 8 | $260.42 | $2,083.33 | $323.15 | $2,585.20 | $2,594.91 | $2,604.66 | $2,624.28 | $2,634.15 | $2,644.05 | $2,663.97 | $2,684.05 | $2,704.29 | $ 4,668.53 |
| 9 | $260.42 | $2,343.75 | $323.15 | $2,908.35 | $2,920.50 | $2,932.69 | $2,957.26 | $2,969.62 | $2,982.04 | $3,007.04 | $3,032.26 | $3,057.71 | $ 5,252.10 |
| 10 | $260.42 | $2,604.17 | $323.15 | $3,231.50 | $3,246.35 | $3,261.27 | $3,291.34 | $3,306.49 | $3,321.71 | $3,352.39 | $3,383.38 | $3,414.67 | $ 5,835.67 |
| 11 | $260.42 | $2,864.58 | $323.15 | $3,554.65 | $3,572.47 | $3,590.39 | $3,626.54 | $3,644.76 | $3,663.09 | $3,700.04 | $3,737.41 | $3,775.20 | $ 6,419.23 |
| 12 | $260.42 | $3,125.00 | $323.15 | $3,877.80 | $3,898.87 | $3,920.07 | $3,962.85 | $3,984.45 | $4,006.17 | $4,050.01 | $4,094.40 | $4,139.33 | $ 7,002.80 |
| 13 | $260.42 | $3,385.42 | $323.15 | $4,200.95 | $4,225.54 | $4,250.29 | $4,300.29 | $4,325.54 | $4,350.96 | $4,402.32 | $4,454.36 | $4,507.11 | $ 7,586.37 |
| 14 | $260.42 | $3,645.83 | $323.15 | $4,524.10 | $4,552.48 | $4,581.06 | $4,638.85 | $4,668.06 | $4,697.49 | $4,756.97 | $4,817.33 | $4,878.56 | $ 8,169.93 |
| 15 | $260.42 | $3,906.25 | $323.15 | $4,847.25 | $4,879.69 | $4,912.39 | $4,978.54 | $5,012.01 | $5,045.74 | $5,113.99 | $5,183.31 | $5,253.73 | $ 8,753.50 |
| 16 | $260.42 | $4,166.67 | $323.15 | $5,170.40 | $5,207.18 | $5,244.26 | $5,319.36 | $5,357.39 | $5,395.73 | $5,473.39 | $5,552.35 | $5,632.65 | $ 9,337.07 |
| 17 | $260.42 | $4,427.08 | $323.15 | $5,493.55 | $5,534.94 | $5,576.69 | $5,661.32 | $5,704.15 | $5,747.48 | $5,835.18 | $5,924.46 | $6,015.36 | $ 9,920.63 |
| 18 | $260.42 | $4,687.50 | $323.15 | $5,816.70 | $5,862.97 | $5,909.67 | $6,004.42 | $6,052.47 | $6,100.98 | $6,199.39 | $6,299.68 | $6,401.89 | $10,504.20 |
| 19 | $260.42 | $4,947.92 | $323.15 | $6,139.85 | $6,191.27 | $6,243.21 | $6,348.66 | $6,402.19 | $6,456.25 | $6,566.02 | $6,678.02 | $6,792.29 | $11,087.77 |
| 20 | $260.42 | $5,208.33 | $323.15 | $6,463.00 | $6,519.85 | $6,577.31 | $6,694.05 | $6,753.36 | $6,813.30 | $6,935.10 | $7,059.51 | $7,186.60 | $11,671.33 |
| 21 | $260.42 | $5,468.75 | $323.15 | $6,786.15 | $6,848.70 | $6,911.96 | $7,040.59 | $7,106.00 | $7,172.13 | $7,306.64 | $7,444.18 | $7,584.84 | $12,254.90 |
| 22 | $260.42 | $5,729.17 | $323.15 | $7,109.30 | $7,177.83 | $7,247.16 | $7,388.29 | $7,460.10 | $7,532.76 | $7,680.65 | $7,832.06 | $7,987.07 | $12,838.47 |
| 23 | $260.42 | $5,989.58 | $323.15 | $7,432.45 | $7,507.23 | $7,582.93 | $7,737.14 | $7,815.68 | $7,895.19 | $8,057.16 | $8,223.17 | $8,393.33 | $13,422.03 |
| 24 | $260.42 | $6,250.00 | $323.15 | $7,755.60 | $7,836.91 | $7,919.26 | $8,087.16 | $8,172.74 | $8,259.43 | $8,436.18 | $8,617.54 | $8,803.64 | $14,005.60 |
| 25 | $260.42 | $6,510.42 | $323.15 | $8,078.75 | $8,166.86 | $8,256.15 | $8,438.35 | $8,531.29 | $8,625.69 | $8,817.72 | $9,015.20 | $9,218.06 | $14,589.17 |
| 26 | $260.42 | $6,770.83 | $323.15 | $8,401.90 | $8,497.08 | $8,593.59 | $8,790.70 | $8,891.34 | $8,993.38 | $9,201.81 | $9,416.17 | $9,636.62 | $15,172.73 |
| 27 | $260.42 | $7,031.25 | $323.15 | $8,725.05 | $8,827.58 | $8,931.61 | $9,144.23 | $9,252.88 | $9,363.12 | $9,588.46 | $9,820.48 | $10,059.37 | $15,756.30 |
| 28 | $260.42 | $7,291.67 | $323.15 | $9,048.20 | $9,158.36 | $9,270.18 | $9,498.94 | $9,615.93 | $9,734.70 | $9,977.69 | $10,228.16 | $10,486.34 | $16,339.87 |
| 29 | $260.42 | $7,552.08 | $323.15 | $9,371.35 | $9,489.41 | $9,609.32 | $9,854.83 | $9,980.49 | $10,108.14 | $10,369.51 | $10,639.23 | $10,917.59 | $16,923.43 |
| 30 | $260.42 | $7,812.50 | $323.15 | $9,694.50 | $9,820.74 | $9,949.02 | $10,211.91 | $10,346.57 | $10,483.44 | $10,763.95 | $11,053.95 | $11,353.15 | $17,507.00 |
| 31 | $260.42 | $8,072.92 | $323.15 | $10,017.65 | $10,152.34 | $10,289.29 | $10,570.17 | $10,714.18 | $10,860.63 | $11,161.01 | $11,471.69 | $11,793.06 | $18,090.57 |
| 32 | $260.42 | $8,333.33 | $323.15 | $10,340.80 | $10,484.22 | $10,630.13 | $10,929.63 | $11,083.32 | $11,239.70 | $11,560.72 | $11,893.14 | $12,237.37 | $18,674.13 |
| 33 | $260.42 | $8,593.75 | $323.15 | $10,663.95 | $10,816.37 | $10,971.54 | $11,290.29 | $11,454.00 | $11,620.66 | $11,963.16 | $12,318.09 | $12,686.13 | $19,257.70 |
| 34 | $260.42 | $8,854.17 | $323.15 | $10,987.10 | $11,148.81 | $11,313.51 | $11,652.15 | $11,826.22 | $12,003.53 | $12,368.53 | $12,746.58 | $13,139.37 | $19,841.27 |
| 35 | $260.42 | $9,114.58 | $323.15 | $11,310.25 | $11,481.52 | $11,656.06 | $12,015.22 | $12,199.99 | $12,388.31 | $12,775.92 | $13,178.65 | $13,597.14 | $20,424.83 |
| 36 | $260.42 | $9,375.00 | $323.15 | $11,633.40 | $11,814.50 | $11,999.17 | $12,379.50 | $12,575.32 | $12,775.02 | $13,186.39 | $13,614.31 | $14,059.50 | $21,008.40 |
| 37 | $260.42 | $9,635.42 | $323.15 | $11,956.55 | $12,147.77 | $12,342.86 | $12,744.99 | $12,952.21 | $13,163.66 | $13,599.61 | $14,053.61 | $14,526.47 | $21,591.97 |

PAYMENT TABLE

INVESTMENT PAYMENT CALCULATION

| | |
|---|---|
| Conventional Loan Payment at 5.75% | $583.57 |
| LESS: Interest Only Loan Payment at 3.125% | $260.42 |
| Difference Applied to Investment | $323.15 |

| LOAN | $100,000 | | | | | | | | | | | | |
|---|---|---|---|---|---|---|---|---|---|---|---|---|---|
| RATE | 3.125% | | | | | | | | | | | | |
| INV AMT | $323.15 | | | | | | | | | | | | |

| | COST OF BORROWING | | | | SYSTEMATIC INVESTMENT | | | | | | | | |
|---|---|---|---|---|---|---|---|---|---|---|---|---|---|
| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
| 38 | $260.42 | $9,895.83 | $323.15 | $12,279.70 | $12,481.31 | $12,687.12 | $13,111.70 | $13,330.68 | $13,554.24 | $14,015.57 | $14,496.56 | $14,998.12 | $22,175.53 |
| 39 | $260.42 | $10,156.25 | $323.15 | $12,602.85 | $12,815.13 | $13,031.95 | $13,479.64 | $13,710.72 | $13,946.78 | $14,434.32 | $14,943.21 | $15,474.48 | $22,759.10 |
| 40 | $260.42 | $10,416.67 | $323.15 | $12,926.00 | $13,149.23 | $13,377.36 | $13,848.79 | $14,092.34 | $14,341.28 | $14,855.85 | $15,393.58 | $15,955.61 | $23,342.67 |
| 41 | $260.42 | $10,677.08 | $323.15 | $13,249.15 | $13,483.61 | $13,723.34 | $14,219.18 | $14,475.56 | $14,737.75 | $15,280.19 | $15,847.70 | $16,441.55 | $23,926.23 |
| 42 | $260.42 | $10,937.50 | $323.15 | $13,572.30 | $13,818.26 | $14,069.91 | $14,590.81 | $14,860.37 | $15,136.21 | $15,707.36 | $16,305.61 | $16,932.34 | $24,509.80 |
| 43 | $260.42 | $11,197.92 | $323.15 | $13,895.45 | $14,153.20 | $14,417.04 | $14,963.67 | $15,246.78 | $15,536.65 | $16,137.38 | $16,767.33 | $17,428.05 | $25,093.37 |
| 44 | $260.42 | $11,458.33 | $323.15 | $14,218.60 | $14,488.41 | $14,764.76 | $15,337.78 | $15,634.81 | $15,939.10 | $16,570.27 | $17,232.90 | $17,928.71 | $25,676.93 |
| 45 | $260.42 | $11,718.75 | $323.15 | $14,541.75 | $14,823.90 | $15,113.06 | $15,713.13 | $16,024.45 | $16,343.56 | $17,006.04 | $17,702.35 | $18,434.38 | $26,260.50 |
| 46 | $260.42 | $11,979.17 | $323.15 | $14,864.90 | $15,159.68 | $15,461.93 | $16,089.74 | $16,415.71 | $16,750.05 | $17,444.72 | $18,175.72 | $18,945.10 | $26,844.07 |
| 47 | $260.42 | $12,239.58 | $323.15 | $15,188.05 | $15,495.73 | $15,811.39 | $16,467.60 | $16,808.61 | $17,158.56 | $17,886.33 | $18,653.02 | $19,460.94 | $27,427.63 |
| 48 | $260.42 | $12,500.00 | $323.15 | $15,511.20 | $15,832.06 | $16,161.43 | $16,846.71 | $17,203.14 | $17,569.12 | $18,330.87 | $19,134.31 | $19,981.93 | $28,011.20 |
| 49 | $260.42 | $12,760.42 | $323.15 | $15,834.35 | $16,168.67 | $16,512.06 | $17,227.10 | $17,599.32 | $17,981.73 | $18,778.38 | $19,619.60 | $20,508.13 | $28,594.77 |
| 50 | $260.42 | $13,020.83 | $323.15 | $16,157.50 | $16,505.57 | $16,863.27 | $17,608.75 | $17,997.15 | $18,396.41 | $19,228.88 | $20,108.94 | $21,039.59 | $29,178.33 |
| 51 | $260.42 | $13,281.25 | $323.15 | $16,480.65 | $16,842.74 | $17,215.06 | $17,991.67 | $18,396.63 | $18,813.16 | $19,682.37 | $20,602.36 | $21,576.37 | $29,761.90 |
| 52 | $260.42 | $13,541.67 | $323.15 | $16,803.80 | $17,180.20 | $17,567.44 | $18,375.87 | $18,797.78 | $19,231.99 | $20,138.89 | $21,099.89 | $22,118.51 | $30,345.47 |
| 53 | $260.42 | $13,802.08 | $323.15 | $17,126.95 | $17,517.93 | $17,920.41 | $18,761.35 | $19,200.60 | $19,652.91 | $20,598.46 | $21,601.57 | $22,666.08 | $30,929.03 |
| 54 | $260.42 | $14,062.50 | $323.15 | $17,450.10 | $17,855.95 | $18,273.96 | $19,148.12 | $19,605.10 | $20,075.94 | $21,061.08 | $22,107.42 | $23,219.12 | $31,512.60 |
| 55 | $260.42 | $14,322.92 | $323.15 | $17,773.25 | $18,194.25 | $18,628.11 | $19,536.17 | $20,011.28 | $20,501.09 | $21,526.79 | $22,617.49 | $23,777.69 | $32,096.17 |
| 56 | $260.42 | $14,583.33 | $323.15 | $18,096.40 | $18,532.83 | $18,982.85 | $19,925.52 | $20,419.16 | $20,928.36 | $21,995.61 | $23,131.81 | $24,341.85 | $32,679.73 |
| 57 | $260.42 | $14,843.75 | $323.15 | $18,419.55 | $18,871.69 | $19,338.17 | $20,316.16 | $20,828.74 | $21,357.77 | $22,467.55 | $23,650.42 | $24,911.65 | $33,263.30 |
| 58 | $260.42 | $15,104.17 | $323.15 | $18,742.70 | $19,210.84 | $19,694.09 | $20,708.11 | $21,240.02 | $21,789.32 | $22,942.64 | $24,173.35 | $25,487.15 | $33,846.87 |
| 59 | $260.42 | $15,364.58 | $323.15 | $19,065.85 | $19,550.27 | $20,050.60 | $21,101.36 | $21,653.02 | $22,223.04 | $23,420.90 | $24,700.64 | $26,068.40 | $34,430.43 |
| 60 | $260.42 | $15,625.00 | $323.15 | $19,389.00 | $19,889.98 | $20,407.71 | $21,495.93 | $22,067.73 | $22,658.92 | $23,902.34 | $25,232.32 | $26,655.47 | $35,014.00 |
| 61 | $260.42 | $15,885.42 | $323.15 | $19,712.15 | $20,229.97 | $20,765.41 | $21,891.81 | $22,484.18 | $23,096.98 | $24,386.99 | $25,768.43 | $27,248.41 | $35,597.57 |
| 62 | $260.42 | $16,145.83 | $323.15 | $20,035.30 | $20,570.25 | $21,123.71 | $22,289.01 | $22,902.36 | $23,537.23 | $24,874.88 | $26,309.01 | $27,847.27 | $36,181.13 |
| 63 | $260.42 | $16,406.25 | $323.15 | $20,358.45 | $20,910.81 | $21,482.60 | $22,687.53 | $23,322.28 | $23,979.68 | $25,366.01 | $26,854.10 | $28,452.13 | $36,764.70 |
| 64 | $260.42 | $16,666.67 | $323.15 | $20,681.60 | $21,251.66 | $21,842.10 | $23,087.39 | $23,743.95 | $24,424.34 | $25,860.43 | $27,403.73 | $29,063.03 | $37,348.27 |
| 65 | $260.42 | $16,927.08 | $323.15 | $21,004.75 | $21,592.79 | $22,202.19 | $23,488.57 | $24,167.38 | $24,871.23 | $26,358.13 | $27,957.93 | $29,680.04 | $37,931.83 |
| 66 | $260.42 | $17,187.50 | $323.15 | $21,327.90 | $21,934.20 | $22,562.88 | $23,891.09 | $24,592.58 | $25,320.35 | $26,859.16 | $28,516.76 | $30,303.22 | $38,515.40 |
| 67 | $260.42 | $17,447.92 | $323.15 | $21,651.05 | $22,275.90 | $22,924.17 | $24,294.96 | $25,019.54 | $25,771.72 | $27,363.52 | $29,080.24 | $30,932.64 | $39,098.97 |
| 68 | $260.42 | $17,708.33 | $323.15 | $21,974.20 | $22,617.88 | $23,286.07 | $24,700.17 | $25,448.29 | $26,225.34 | $27,871.25 | $29,648.42 | $31,568.34 | $39,682.53 |
| 69 | $260.42 | $17,968.75 | $323.15 | $22,297.35 | $22,960.15 | $23,648.57 | $25,106.73 | $25,878.82 | $26,681.24 | $28,382.36 | $30,221.33 | $32,210.41 | $40,266.10 |
| 70 | $260.42 | $18,229.17 | $323.15 | $22,620.50 | $23,302.70 | $24,011.67 | $25,514.65 | $26,311.14 | $27,139.41 | $28,896.88 | $30,799.02 | $32,858.89 | $40,849.67 |
| 71 | $260.42 | $18,489.58 | $323.15 | $22,943.65 | $23,645.54 | $24,375.38 | $25,923.92 | $26,745.27 | $27,599.87 | $29,414.83 | $31,381.52 | $33,513.86 | $41,433.23 |
| 72 | $260.42 | $18,750.00 | $323.15 | $23,266.80 | $23,988.66 | $24,739.69 | $26,334.56 | $27,181.21 | $28,062.64 | $29,936.24 | $31,968.88 | $34,175.38 | $42,016.80 |
| 73 | $260.42 | $19,010.42 | $323.15 | $23,589.95 | $24,332.07 | $25,104.61 | $26,746.57 | $27,618.96 | $28,527.72 | $30,461.12 | $32,561.13 | $34,843.52 | $42,600.37 |
| 74 | $260.42 | $19,270.83 | $323.15 | $23,913.10 | $24,675.77 | $25,470.14 | $27,159.95 | $28,058.53 | $28,995.12 | $30,989.49 | $33,158.31 | $35,518.34 | $43,183.93 |
| 75 | $260.42 | $19,531.25 | $323.15 | $24,236.25 | $25,019.75 | $25,836.28 | $27,574.71 | $28,499.94 | $29,464.86 | $31,521.40 | $33,760.47 | $36,199.90 | $43,767.50 |

PAYMENT TABLE

| LOAN | $100,000 | | | | | INVESTMENT PAYMENT CALCULATION | | | | | |
|---|---|---|---|---|---|---|---|---|---|---|---|
| RATE | 3.125% | | | | | Conventional Loan Payment at 5.75% | | | $583.57 | | |
| INV | $323.15 | | | | | LESS: Interest Only Loan Payment at 3.125% | | | $260.42 | | |
| AMT | | | | | | Difference Applied to Investment | | | $323.15 | | |

| | COST OF BORROWING | | | | SYSTEMATIC INVESTMENT | | | | | | |
|---|---|---|---|---|---|---|---|---|---|---|---|
| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |

| DATE | MIN MONTHLY INT PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
|---|---|---|---|---|---|---|---|---|---|---|---|---|---|
| 76 | $260.42 | $19,791.67 | $323.15 | $24,559.40 | $25,364.02 | $26,203.03 | $27,990.86 | $28,943.19 | $29,936.95 | $32,056.84 | $34,367.65 | $36,888.28 | $44,351.07 |
| 77 | $260.42 | $20,052.08 | $323.15 | $24,882.55 | $25,708.58 | $26,570.39 | $28,408.39 | $29,388.28 | $30,411.40 | $32,595.86 | $34,979.89 | $37,583.55 | $44,934.63 |
| 78 | $260.42 | $20,312.50 | $323.15 | $25,205.70 | $26,053.42 | $26,938.36 | $28,827.31 | $29,835.23 | $30,888.22 | $33,138.47 | $35,597.24 | $38,285.76 | $45,518.20 |
| 79 | $260.42 | $20,572.92 | $323.15 | $25,528.85 | $26,398.55 | $27,306.95 | $29,247.63 | $30,284.04 | $31,367.43 | $33,684.70 | $36,219.72 | $38,995.00 | $46,101.77 |
| 80 | $260.42 | $20,833.33 | $323.15 | $25,852.00 | $26,743.97 | $27,676.15 | $29,669.35 | $30,734.72 | $31,849.03 | $34,234.57 | $36,847.40 | $39,711.33 | $46,685.33 |
| 81 | $260.42 | $21,093.75 | $323.15 | $26,175.15 | $27,089.67 | $28,045.97 | $30,092.47 | $31,187.27 | $32,333.05 | $34,788.10 | $37,480.30 | $40,434.83 | $47,268.90 |
| 82 | $260.42 | $21,354.17 | $323.15 | $26,498.30 | $27,435.67 | $28,416.40 | $30,517.01 | $31,641.72 | $32,819.48 | $35,345.33 | $38,118.48 | $41,165.56 | $47,852.47 |
| 83 | $260.42 | $21,614.58 | $323.15 | $26,821.45 | $27,781.95 | $28,787.45 | $30,942.96 | $32,098.05 | $33,308.34 | $35,906.27 | $38,761.98 | $41,903.60 | $48,436.03 |
| 84 | $260.42 | $21,875.00 | $323.15 | $27,144.60 | $28,128.52 | $29,159.12 | $31,370.33 | $32,556.29 | $33,799.65 | $36,470.94 | $39,410.84 | $42,649.01 | $49,019.60 |
| 85 | $260.42 | $22,135.42 | $323.15 | $27,467.75 | $28,475.38 | $29,531.40 | $31,799.12 | $33,016.44 | $34,293.41 | $37,039.36 | $40,065.10 | $43,401.88 | $49,603.17 |
| 86 | $260.42 | $22,395.83 | $323.15 | $27,790.90 | $28,822.53 | $29,904.31 | $32,229.35 | $33,478.51 | $34,789.64 | $37,611.62 | $40,724.82 | $44,162.28 | $50,186.73 |
| 87 | $260.42 | $22,656.25 | $323.15 | $28,114.05 | $29,169.97 | $30,277.84 | $32,661.00 | $33,942.50 | $35,288.36 | $38,187.67 | $41,390.04 | $44,930.29 | $50,770.30 |
| 88 | $260.42 | $22,916.67 | $323.15 | $28,437.20 | $29,517.69 | $30,651.99 | $33,094.10 | $34,408.42 | $35,789.57 | $38,767.56 | $42,060.80 | $45,705.97 | $51,353.87 |
| 89 | $260.42 | $23,177.08 | $323.15 | $28,760.35 | $29,865.71 | $31,026.77 | $33,528.64 | $34,876.28 | $36,293.28 | $39,351.31 | $42,737.15 | $46,489.41 | $51,937.43 |
| 90 | $260.42 | $23,437.50 | $323.15 | $29,083.50 | $30,214.02 | $31,402.17 | $33,964.63 | $35,346.10 | $36,799.51 | $39,938.96 | $43,419.13 | $47,280.69 | $52,521.00 |
| 91 | $260.42 | $23,697.92 | $323.15 | $29,406.65 | $30,562.62 | $31,778.19 | $34,402.07 | $35,817.87 | $37,308.27 | $40,530.52 | $44,106.80 | $48,079.88 | $53,104.57 |
| 92 | $260.42 | $23,958.33 | $323.15 | $29,729.80 | $30,911.50 | $32,154.84 | $34,840.98 | $36,291.61 | $37,819.58 | $41,126.03 | $44,800.20 | $48,887.06 | $53,688.13 |
| 93 | $260.42 | $24,218.75 | $323.15 | $30,052.95 | $31,260.68 | $32,532.12 | $35,281.34 | $36,767.32 | $38,333.45 | $41,725.51 | $45,499.38 | $49,702.31 | $54,271.70 |
| 94 | $260.42 | $24,479.17 | $323.15 | $30,376.10 | $31,610.15 | $32,910.03 | $35,723.17 | $37,245.01 | $38,849.88 | $42,328.99 | $46,204.39 | $50,525.72 | $54,855.27 |
| 95 | $260.42 | $24,739.58 | $323.15 | $30,699.25 | $31,959.91 | $33,288.57 | $36,166.47 | $37,724.70 | $39,368.89 | $42,936.48 | $46,915.26 | $51,357.35 | $55,438.83 |
| 96 | $260.42 | $25,000.00 | $323.15 | $31,022.40 | $32,309.97 | $33,667.74 | $36,611.26 | $38,206.38 | $39,890.50 | $43,548.03 | $47,632.07 | $52,197.31 | $56,022.40 |
| 97 | $260.42 | $25,260.42 | $323.15 | $31,345.55 | $32,660.31 | $34,047.54 | $37,057.52 | $38,690.07 | $40,414.72 | $44,163.65 | $48,354.84 | $53,045.66 | $56,605.97 |
| 98 | $260.42 | $25,520.83 | $323.15 | $31,668.70 | $33,010.95 | $34,427.98 | $37,505.27 | $39,175.77 | $40,941.56 | $44,783.38 | $49,083.64 | $53,902.50 | $57,189.53 |
| 99 | $260.42 | $25,781.25 | $323.15 | $31,991.85 | $33,361.88 | $34,809.04 | $37,954.52 | $39,663.50 | $41,471.03 | $45,407.24 | $49,818.52 | $54,767.91 | $57,773.10 |
| 100 | $260.42 | $26,041.67 | $323.15 | $32,315.00 | $33,713.10 | $35,190.75 | $38,405.26 | $40,153.26 | $42,003.16 | $46,035.26 | $50,559.52 | $55,641.97 | $58,356.67 |
| 101 | $260.42 | $26,302.08 | $323.15 | $32,638.15 | $34,064.61 | $35,573.09 | $38,857.51 | $40,645.07 | $42,537.94 | $46,667.47 | $51,306.69 | $56,524.77 | $58,940.23 |
| 102 | $260.42 | $26,562.50 | $323.15 | $32,961.30 | $34,416.42 | $35,956.07 | $39,311.26 | $41,138.92 | $43,075.39 | $47,303.89 | $52,060.09 | $57,416.40 | $59,523.80 |
| 103 | $260.42 | $26,822.92 | $323.15 | $33,284.45 | $34,768.52 | $36,339.68 | $39,766.52 | $41,634.83 | $43,615.54 | $47,944.55 | $52,819.76 | $58,316.95 | $60,107.37 |
| 104 | $260.42 | $27,083.33 | $323.15 | $33,607.60 | $35,120.91 | $36,723.94 | $40,223.30 | $42,132.80 | $44,158.38 | $48,589.49 | $53,585.77 | $59,226.50 | $60,690.93 |
| 105 | $260.42 | $27,343.75 | $323.15 | $33,930.75 | $35,473.60 | $37,108.83 | $40,681.61 | $42,632.85 | $44,703.94 | $49,238.72 | $54,358.16 | $60,145.14 | $61,274.50 |
| 106 | $260.42 | $27,604.17 | $323.15 | $34,253.90 | $35,826.58 | $37,494.37 | $41,141.44 | $43,134.98 | $45,252.22 | $49,892.28 | $55,136.99 | $61,072.98 | $61,858.07 |
| 107 | $260.42 | $27,864.58 | $323.15 | $34,577.05 | $36,179.85 | $37,880.55 | $41,602.81 | $43,639.21 | $45,803.25 | $50,550.20 | $55,922.31 | $62,010.09 | $62,441.63 |
| 108 | $260.42 | $28,125.00 | $323.15 | $34,900.20 | $36,533.42 | $38,267.37 | $42,065.71 | $44,145.54 | $46,357.03 | $51,212.51 | $56,714.17 | $62,956.57 | $63,025.20 |
| 109 | $260.42 | $28,385.42 | $323.15 | $35,223.35 | $36,887.28 | $38,654.84 | $42,530.16 | $44,653.97 | $46,913.58 | $51,879.23 | $57,512.63 | $63,912.52 | $63,608.77 |
| 110 | $260.42 | $28,645.83 | $323.15 | $35,546.50 | $37,241.44 | $39,042.95 | $42,996.15 | $45,164.53 | $47,472.92 | $52,550.40 | $58,317.75 | $64,878.02 | $64,192.33 |
| 111 | $260.42 | $28,906.25 | $323.15 | $35,869.65 | $37,595.90 | $39,431.71 | $43,463.70 | $45,677.21 | $48,035.05 | $53,226.04 | $59,129.57 | $65,853.18 | $64,775.90 |
| 112 | $260.42 | $29,166.67 | $323.15 | $36,192.80 | $37,950.65 | $39,821.12 | $43,932.80 | $46,192.03 | $48,599.99 | $53,906.18 | $59,948.16 | $66,838.10 | $65,359.47 |
| 113 | $260.42 | $29,427.08 | $323.15 | $36,515.95 | $38,305.69 | $40,211.18 | $44,403.47 | $46,708.99 | $49,167.75 | $54,590.86 | $60,773.57 | $67,832.86 | $65,943.03 |

PAYMENT TABLE -continued

INVESTMENT PAYMENT CALCULATION

| | | |
|---|---|---|
| Conventional Loan Payment at 5.75% | | $583.57 |
| LESS: Interest Only Loan Payment at 3.125% | | $260.42 |
| Difference Applied to Investment | | $323.15 |

SYSTEMATIC INVESTMENT

| LOAN | $100,000 | | | | | | | | | | | | |
|---|---|---|---|---|---|---|---|---|---|---|---|---|---|
| RATE | 3.125% | | | | | | | | | | | | |
| INV AMT | $323.15 | | | | | | | | | | | | |

COST OF BORROWING

| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
|---|---|---|---|---|---|---|---|---|---|---|---|---|---|
| 114 | $260.42 | $29,687.50 | $323.15 | $36,839.10 | $38,661.03 | $40,601.88 | $44,875.71 | $47,228.11 | $49,738.36 | $55,280.10 | $61,605.86 | $68,837.57 | $66,526.60 |
| 115 | $260.42 | $29,947.92 | $323.15 | $37,162.25 | $39,016.67 | $40,993.24 | $45,349.53 | $47,749.39 | $50,311.81 | $55,973.94 | $62,445.08 | $69,852.33 | $67,110.17 |
| 116 | $260.42 | $30,208.33 | $323.15 | $37,485.40 | $39,372.60 | $41,385.25 | $45,824.92 | $48,272.84 | $50,888.14 | $56,672.41 | $63,291.30 | $70,877.23 | $67,693.73 |
| 117 | $260.42 | $30,468.75 | $323.15 | $37,808.55 | $39,728.83 | $41,777.92 | $46,301.90 | $48,798.47 | $51,467.35 | $57,375.53 | $64,144.57 | $71,912.39 | $68,277.30 |
| 118 | $260.42 | $30,729.17 | $323.15 | $38,131.70 | $40,085.36 | $42,171.23 | $46,780.46 | $49,326.30 | $52,049.45 | $58,083.33 | $65,004.95 | $72,957.89 | $68,860.87 |
| 119 | $260.42 | $30,989.58 | $323.15 | $38,454.85 | $40,442.18 | $42,565.21 | $47,260.62 | $49,856.32 | $52,634.46 | $58,795.86 | $65,872.50 | $74,013.85 | $69,444.43 |
| 120 | $260.42 | $31,250.00 | $323.15 | $38,778.00 | $40,799.30 | $42,959.84 | $47,742.39 | $50,388.55 | $53,222.40 | $59,513.14 | $66,747.29 | $75,080.37 | $70,028.00 |
| 121 | $260.42 | $31,510.42 | $323.15 | $39,101.15 | $41,156.72 | $43,355.13 | $48,225.76 | $50,923.00 | $53,813.28 | $60,235.20 | $67,629.36 | $76,157.56 | $70,611.57 |
| 122 | $260.42 | $31,770.83 | $323.15 | $39,424.30 | $41,514.44 | $43,751.07 | $48,710.74 | $51,459.67 | $54,407.11 | $60,962.07 | $68,518.78 | $77,245.51 | $71,195.13 |
| 123 | $260.42 | $32,031.25 | $323.15 | $39,747.45 | $41,872.45 | $44,147.68 | $49,197.33 | $51,998.59 | $55,003.91 | $61,693.79 | $69,415.61 | $78,344.35 | $71,778.70 |
| 124 | $260.42 | $32,291.67 | $323.15 | $40,070.60 | $42,230.77 | $44,544.95 | $49,685.55 | $52,539.74 | $55,603.70 | $62,430.38 | $70,319.92 | $79,454.18 | $72,362.27 |
| 125 | $260.42 | $32,552.08 | $323.15 | $40,393.75 | $42,589.38 | $44,942.88 | $50,175.40 | $53,083.16 | $56,206.48 | $63,171.89 | $71,231.76 | $80,575.10 | $72,945.83 |
| 126 | $260.42 | $32,812.50 | $323.15 | $40,716.90 | $42,948.29 | $45,341.47 | $50,666.87 | $53,628.83 | $56,812.28 | $63,918.34 | $72,151.20 | $81,707.23 | $73,529.40 |
| 127 | $260.42 | $33,072.92 | $323.15 | $41,040.05 | $43,307.50 | $45,740.73 | $51,159.99 | $54,176.78 | $57,421.10 | $64,669.77 | $73,078.30 | $82,850.69 | $74,112.97 |
| 128 | $260.42 | $33,333.33 | $323.15 | $41,363.20 | $43,667.01 | $46,140.65 | $51,654.75 | $54,727.01 | $58,032.98 | $65,426.20 | $74,013.13 | $84,005.57 | $74,696.53 |
| 129 | $260.42 | $33,593.75 | $323.15 | $41,686.35 | $44,026.82 | $46,541.24 | $52,151.16 | $55,279.54 | $58,647.91 | $66,187.68 | $74,955.75 | $85,172.01 | $75,280.10 |
| 130 | $260.42 | $33,854.17 | $323.15 | $42,009.50 | $44,386.94 | $46,942.50 | $52,649.23 | $55,834.37 | $59,265.91 | $66,954.24 | $75,906.22 | $86,350.11 | $75,863.67 |
| 131 | $260.42 | $34,114.58 | $323.15 | $42,332.65 | $44,747.33 | $47,344.43 | $53,148.95 | $56,391.51 | $59,887.01 | $67,725.90 | $76,864.62 | $87,540.00 | $76,447.23 |
| 132 | $260.42 | $34,375.00 | $323.15 | $42,655.80 | $45,108.04 | $47,747.02 | $53,650.34 | $56,950.97 | $60,511.21 | $68,502.71 | $77,831.00 | $88,741.78 | $77,030.80 |
| 133 | $260.42 | $34,635.42 | $323.15 | $42,978.95 | $45,469.05 | $48,150.29 | $54,153.40 | $57,512.76 | $61,138.53 | $69,284.70 | $78,805.43 | $89,955.58 | $77,614.37 |
| 134 | $260.42 | $34,895.83 | $323.15 | $43,302.10 | $45,830.36 | $48,554.23 | $54,658.14 | $58,076.89 | $61,768.99 | $70,071.91 | $79,787.99 | $91,181.51 | $78,197.93 |
| 135 | $260.42 | $35,156.25 | $323.15 | $43,625.25 | $46,191.97 | $48,958.84 | $55,164.56 | $58,643.38 | $62,402.60 | $70,864.36 | $80,778.73 | $92,419.71 | $78,781.50 |
| 136 | $260.42 | $35,416.67 | $323.15 | $43,948.40 | $46,553.88 | $49,364.13 | $55,672.67 | $59,212.22 | $63,039.38 | $71,662.09 | $81,777.73 | $93,670.29 | $79,365.07 |
| 137 | $260.42 | $35,677.08 | $323.15 | $44,271.55 | $46,916.10 | $49,770.09 | $56,182.47 | $59,783.44 | $63,679.34 | $72,465.14 | $82,785.06 | $94,933.37 | $79,948.63 |
| 138 | $260.42 | $35,937.50 | $323.15 | $44,594.70 | $47,278.61 | $50,176.73 | $56,693.97 | $60,357.03 | $64,322.50 | $73,273.55 | $83,800.77 | $96,209.09 | $80,532.20 |
| 139 | $260.42 | $36,197.92 | $323.15 | $44,917.85 | $47,641.43 | $50,584.05 | $57,207.18 | $60,933.01 | $64,968.88 | $74,087.34 | $84,824.96 | $97,497.56 | $81,115.77 |
| 140 | $260.42 | $36,458.33 | $323.15 | $45,241.00 | $48,004.55 | $50,992.04 | $57,722.10 | $61,511.40 | $65,618.49 | $74,906.56 | $85,857.67 | $98,798.92 | $81,699.33 |
| 141 | $260.42 | $36,718.75 | $323.15 | $45,564.15 | $48,367.98 | $51,400.72 | $58,238.73 | $62,092.19 | $66,271.35 | $75,731.24 | $86,899.00 | $100,113.29 | $82,282.90 |
| 142 | $260.42 | $36,979.17 | $323.15 | $45,887.30 | $48,731.70 | $51,810.07 | $58,757.09 | $62,675.41 | $66,927.47 | $76,561.42 | $87,949.00 | $101,440.80 | $82,866.47 |
| 143 | $260.42 | $37,239.58 | $323.15 | $46,210.45 | $49,095.73 | $52,220.11 | $59,277.17 | $63,261.05 | $67,586.88 | $77,397.14 | $89,007.75 | $102,781.59 | $83,450.03 |
| 144 | $260.42 | $37,500.00 | $323.15 | $46,533.60 | $49,460.06 | $52,630.83 | $59,798.99 | $63,849.13 | $68,249.58 | $78,238.42 | $90,075.32 | $104,135.79 | $84,033.60 |
| 145 | $260.42 | $37,760.42 | $323.15 | $46,856.75 | $49,824.70 | $53,042.24 | $60,322.55 | $64,439.67 | $68,915.59 | $79,085.31 | $91,151.79 | $105,503.53 | $84,617.17 |
| 146 | $260.42 | $38,020.83 | $323.15 | $47,179.90 | $50,189.64 | $53,454.33 | $60,847.85 | $65,032.66 | $69,584.93 | $79,937.85 | $92,237.24 | $106,884.95 | $85,200.73 |
| 147 | $260.42 | $38,281.25 | $323.15 | $47,503.05 | $50,554.88 | $53,867.11 | $61,374.90 | $65,628.13 | $70,257.62 | $80,796.08 | $93,331.72 | $108,280.18 | $85,784.30 |
| 148 | $260.42 | $38,541.67 | $323.15 | $47,826.20 | $50,920.43 | $54,280.58 | $61,903.72 | $66,226.08 | $70,933.68 | $81,660.00 | $94,435.33 | $109,689.36 | $86,367.87 |
| 149 | $260.42 | $38,802.08 | $323.15 | $48,149.35 | $51,286.28 | $54,694.73 | $62,434.29 | $66,826.51 | $71,613.11 | $82,529.73 | $95,548.13 | $111,112.64 | $86,951.43 |
| 150 | $260.42 | $39,062.50 | $323.15 | $48,472.50 | $51,652.44 | $55,109.58 | $62,966.63 | $67,429.45 | $72,295.94 | $83,405.23 | $96,670.21 | $112,550.14 | $87,535.00 |
| 151 | $260.42 | $39,322.92 | $323.15 | $48,795.65 | $52,018.91 | $55,525.12 | $63,500.75 | $68,034.91 | $72,982.19 | $84,286.57 | $97,801.64 | $114,002.03 | $88,118.57 |

-continued

PAYMENT TABLE

| INVESTMENT PAYMENT CALCULATION | | |
|---|---|---|
| Conventional Loan Payment at 5.75% | | $583.57 |
| LESS: Interest Only Loan Payment at 3.125% | | $260.42 |
| Difference Applied to Investment | | $323.15 |
| SYSTEMATIC INVESTMENT | | |

| LOAN | $100,000 | | | | | | | | | | | |
|---|---|---|---|---|---|---|---|---|---|---|---|---|
| RATE | 3.125% | | | | | | | | | | | |
| INV AMT | $323.15 | | | | | | | | | | | |

| | COST OF BORROWING | | | | | | | | | | | |
|---|---|---|---|---|---|---|---|---|---|---|---|---|
| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
| 152 | $260.42 | $39,583.33 | $323.15 | $49,118.80 | $52,385.67 | $55,941.35 | $64,036.64 | $68,642.88 | $73,671.86 | $85,173.78 | $98,942.50 | $115,468.43 | $88,702.13 |
| 153 | $260.42 | $39,843.75 | $323.15 | $49,441.95 | $52,752.75 | $56,358.27 | $64,574.32 | $69,253.39 | $74,364.99 | $86,066.91 | $100,092.86 | $116,949.49 | $89,285.70 |
| 154 | $260.42 | $40,104.17 | $323.15 | $49,765.10 | $53,120.13 | $56,775.89 | $65,113.80 | $69,866.44 | $75,061.58 | $86,966.00 | $101,252.81 | $118,445.37 | $89,869.27 |
| 155 | $260.42 | $40,364.58 | $323.15 | $50,088.25 | $53,487.81 | $57,194.21 | $65,655.07 | $70,482.05 | $75,761.65 | $87,871.07 | $102,422.43 | $119,956.21 | $90,452.83 |
| 156 | $260.42 | $40,625.00 | $323.15 | $50,411.40 | $53,855.81 | $57,613.22 | $66,198.15 | $71,100.22 | $76,465.23 | $88,782.19 | $103,601.79 | $121,482.15 | $91,036.40 |
| 157 | $260.42 | $40,885.42 | $323.15 | $50,734.55 | $54,224.11 | $58,032.93 | $66,743.04 | $71,720.97 | $77,172.32 | $89,699.37 | $104,790.98 | $123,023.35 | $91,619.97 |
| 158 | $260.42 | $41,145.83 | $323.15 | $51,057.70 | $54,592.71 | $58,453.34 | $67,289.74 | $72,344.30 | $77,882.95 | $90,622.67 | $105,990.08 | $124,579.97 | $92,203.53 |
| 159 | $260.42 | $41,406.25 | $323.15 | $51,380.85 | $54,961.62 | $58,874.45 | $67,838.27 | $72,970.23 | $78,597.13 | $91,552.13 | $107,199.17 | $126,152.15 | $92,787.10 |
| 160 | $260.42 | $41,666.67 | $323.15 | $51,704.00 | $55,330.85 | $59,296.26 | $68,388.62 | $73,598.77 | $79,314.88 | $92,487.78 | $108,418.34 | $127,740.05 | $93,370.67 |
| 161 | $260.42 | $41,927.08 | $323.15 | $52,027.15 | $55,700.37 | $59,718.78 | $68,940.81 | $74,229.93 | $80,036.22 | $93,429.67 | $109,647.67 | $129,343.83 | $93,954.23 |
| 162 | $260.42 | $42,187.50 | $323.15 | $52,350.30 | $56,070.21 | $60,142.00 | $69,494.84 | $74,863.72 | $80,761.17 | $94,377.84 | $110,887.25 | $130,963.65 | $94,537.80 |
| 163 | $260.42 | $42,447.92 | $323.15 | $52,673.45 | $56,440.35 | $60,565.92 | $70,050.72 | $75,500.15 | $81,489.74 | $95,332.33 | $112,137.15 | $132,599.67 | $95,121.37 |
| 164 | $260.42 | $42,708.33 | $323.15 | $52,996.60 | $56,810.81 | $60,990.56 | $70,608.45 | $76,139.23 | $82,221.95 | $96,293.18 | $113,397.47 | $134,252.05 | $95,704.93 |
| 165 | $260.42 | $42,968.75 | $323.15 | $53,319.75 | $57,181.57 | $61,415.90 | $71,168.04 | $76,780.97 | $82,957.83 | $97,260.44 | $114,668.29 | $135,920.95 | $96,288.50 |
| 166 | $260.42 | $43,229.17 | $323.15 | $53,642.90 | $57,552.64 | $61,841.94 | $71,729.49 | $77,425.39 | $83,697.38 | $98,234.15 | $115,949.70 | $137,606.54 | $96,872.07 |
| 167 | $260.42 | $43,489.58 | $323.15 | $53,966.05 | $57,924.02 | $62,268.70 | $72,292.82 | $78,072.49 | $84,440.64 | $99,214.34 | $117,241.79 | $139,308.99 | $97,455.63 |
| 168 | $260.42 | $43,750.00 | $323.15 | $54,289.20 | $58,295.71 | $62,696.17 | $72,858.02 | $78,722.29 | $85,187.60 | $100,201.08 | $118,544.65 | $141,028.46 | $98,039.20 |
| 169 | $260.42 | $44,010.42 | $323.15 | $54,612.35 | $58,667.71 | $63,124.35 | $73,425.11 | $79,374.79 | $85,938.31 | $101,194.39 | $119,858.37 | $142,765.13 | $98,622.77 |
| 170 | $260.42 | $44,270.83 | $323.15 | $54,935.50 | $59,040.02 | $63,553.25 | $73,994.08 | $80,030.02 | $86,692.77 | $102,194.32 | $121,183.03 | $144,519.16 | $99,206.33 |
| 171 | $260.42 | $44,531.25 | $323.15 | $55,258.65 | $59,412.64 | $63,982.86 | $74,564.96 | $80,687.97 | $87,450.99 | $103,200.92 | $122,518.73 | $146,290.73 | $99,789.90 |
| 172 | $260.42 | $44,791.67 | $323.15 | $55,581.80 | $59,785.57 | $64,413.19 | $75,137.74 | $81,348.67 | $88,213.02 | $104,214.23 | $123,865.56 | $148,080.02 | $100,373.47 |
| 173 | $260.42 | $45,052.08 | $323.15 | $55,904.95 | $60,158.81 | $64,844.23 | $75,712.42 | $82,012.12 | $88,978.85 | $105,234.30 | $125,223.62 | $149,887.20 | $100,957.03 |
| 174 | $260.42 | $45,312.50 | $323.15 | $56,228.10 | $60,532.36 | $65,275.99 | $76,289.02 | $82,678.33 | $89,748.51 | $106,261.17 | $126,592.99 | $151,712.46 | $101,540.60 |
| 175 | $260.42 | $45,572.92 | $323.15 | $56,551.25 | $60,906.22 | $65,708.48 | $76,867.55 | $83,347.32 | $90,522.01 | $107,294.88 | $127,973.78 | $153,555.96 | $102,124.17 |
| 176 | $260.42 | $45,833.33 | $323.15 | $56,874.40 | $61,280.40 | $66,141.68 | $77,448.00 | $84,019.10 | $91,299.39 | $108,335.48 | $129,366.09 | $155,417.90 | $102,707.73 |
| 177 | $260.42 | $46,093.75 | $323.15 | $57,197.55 | $61,654.88 | $66,575.60 | $78,030.39 | $84,693.68 | $92,080.65 | $109,383.02 | $130,769.96 | $157,298.46 | $103,291.30 |
| 178 | $260.42 | $46,354.17 | $323.15 | $57,520.70 | $62,029.68 | $67,010.25 | $78,614.72 | $85,371.06 | $92,865.82 | $110,437.55 | $132,185.55 | $159,197.83 | $103,874.87 |
| 179 | $260.42 | $46,614.58 | $323.15 | $57,843.85 | $62,404.79 | $67,445.62 | $79,200.99 | $86,051.27 | $93,654.92 | $111,499.10 | $133,612.94 | $161,116.19 | $104,458.43 |
| 180 | $260.42 | $46,875.00 | $323.15 | $58,167.00 | $62,780.21 | $67,881.72 | $79,789.22 | $86,734.32 | $94,447.96 | $112,567.73 | $135,052.23 | $163,053.73 | $105,042.00 |
| 181 | $260.42 | $47,135.42 | $323.15 | $58,490.15 | $63,155.95 | $68,318.55 | $80,379.41 | $87,420.21 | $95,244.96 | $113,643.49 | $136,503.50 | $165,010.65 | $105,625.57 |
| 182 | $260.42 | $47,395.83 | $323.15 | $58,813.30 | $63,532.00 | $68,756.10 | $80,971.57 | $88,108.95 | $96,045.95 | $114,726.42 | $137,966.88 | $166,987.14 | $106,209.13 |
| 183 | $260.42 | $47,656.25 | $323.15 | $59,136.45 | $63,908.36 | $69,194.38 | $81,565.70 | $88,800.57 | $96,850.95 | $115,816.56 | $139,442.44 | $168,983.39 | $106,792.70 |
| 184 | $260.42 | $47,916.67 | $323.15 | $59,459.60 | $64,285.04 | $69,633.39 | $82,161.82 | $89,495.07 | $97,659.97 | $116,913.98 | $140,930.31 | $170,999.61 | $107,376.27 |
| 185 | $260.42 | $48,177.08 | $323.15 | $59,782.75 | $64,662.03 | $70,073.14 | $82,759.92 | $90,192.46 | $98,473.03 | $118,018.71 | $142,430.57 | $173,035.99 | $107,959.83 |
| 186 | $260.42 | $48,437.50 | $323.15 | $60,105.90 | $65,039.33 | $70,513.62 | $83,360.01 | $90,892.76 | $99,290.17 | $119,130.80 | $143,943.33 | $175,092.73 | $108,543.40 |
| 187 | $260.42 | $48,697.92 | $323.15 | $60,429.05 | $65,416.95 | $70,954.83 | $83,962.10 | $91,595.98 | $100,111.38 | $120,250.31 | $145,468.70 | $177,170.04 | $109,126.97 |
| 188 | $260.42 | $48,958.33 | $323.15 | $60,752.20 | $65,794.88 | $71,396.77 | $84,566.20 | $92,302.12 | $100,936.71 | $121,377.29 | $147,006.79 | $179,268.12 | $109,710.53 |
| 189 | $260.42 | $49,218.75 | $323.15 | $61,075.35 | $66,173.13 | $71,839.46 | $85,172.32 | $93,011.21 | $101,766.15 | $122,511.77 | $148,557.69 | $181,387.18 | $110,294.10 |

PAYMENT TABLE

INVESTMENT PAYMENT CALCULATION

| | |
|---|---|
| Conventional Loan Payment at 5.75% | $583.57 |
| LESS: Interest Only Loan Payment at 3.125% | $260.42 |
| Difference Applied to Investment | $323.15 |

| LOAN | $100,000 | | | | | | | | | | | |
|---|---|---|---|---|---|---|---|---|---|---|---|---|
| RATE | 3.125% | | | | | | | | | | | |
| INV AMT | $323.15 | | | | | | | | | | | |

| | COST OF BORROWING | | | | SYSTEMATIC INVESTMENT | | | | | | | |
|---|---|---|---|---|---|---|---|---|---|---|---|---|
| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
| 190 | $260.42 | $49,479.17 | $323.15 | $61,398.50 | $66,551.70 | $72,282.88 | $ 85,780.45 | $ 93,723.25 | $102,599.75 | $123,653.82 | $150,121.51 | $183,527.44 | $110,877.67 |
| 191 | $260.42 | $49,739.58 | $323.15 | $61,721.65 | $66,930.58 | $72,727.04 | $ 86,390.62 | $ 94,438.26 | $103,437.52 | $124,803.49 | $151,698.36 | $185,689.09 | $111,461.23 |
| 192 | $260.42 | $50,000.00 | $323.15 | $62,044.80 | $67,309.77 | $73,171.94 | $ 87,002.81 | $ 95,156.25 | $104,279.47 | $125,960.81 | $153,288.36 | $187,872.36 | $112,044.80 |
| 193 | $260.42 | $50,260.42 | $323.15 | $62,367.95 | $67,689.28 | $73,617.58 | $ 87,617.05 | $ 95,877.23 | $105,125.63 | $127,125.86 | $154,891.61 | $190,077.47 | $112,628.37 |
| 194 | $260.42 | $50,520.83 | $323.15 | $62,691.10 | $68,069.11 | $74,063.96 | $ 88,233.33 | $ 96,601.22 | $105,976.03 | $128,298.67 | $156,508.21 | $192,304.62 | $113,211.93 |
| 195 | $260.42 | $50,781.25 | $323.15 | $63,014.25 | $68,449.25 | $74,511.09 | $ 88,851.67 | $ 97,328.22 | $106,830.67 | $129,479.30 | $158,138.29 | $194,554.05 | $113,795.50 |
| 196 | $260.42 | $51,041.67 | $323.15 | $63,337.40 | $68,829.71 | $74,958.97 | $ 89,472.07 | $ 98,058.25 | $107,689.59 | $130,667.80 | $159,781.95 | $196,825.97 | $114,379.07 |
| 197 | $260.42 | $51,302.08 | $323.15 | $63,660.55 | $69,210.49 | $75,407.59 | $ 90,094.54 | $ 98,791.32 | $108,552.80 | $131,864.22 | $161,439.31 | $199,120.62 | $114,962.63 |
| 198 | $260.42 | $51,562.50 | $323.15 | $63,983.70 | $69,591.58 | $75,856.95 | $ 90,719.08 | $ 99,527.45 | $109,420.33 | $133,068.62 | $163,110.48 | $201,438.20 | $115,546.20 |
| 199 | $260.42 | $51,822.92 | $323.15 | $64,306.85 | $69,973.00 | $76,307.07 | $ 91,345.70 | $100,266.64 | $110,292.20 | $134,281.05 | $164,795.58 | $203,778.97 | $116,129.77 |
| 200 | $260.42 | $52,083.33 | $323.15 | $64,630.00 | $70,354.73 | $76,757.94 | $ 91,974.42 | $101,008.92 | $111,168.43 | $135,501.56 | $166,494.72 | $206,143.14 | $116,713.33 |
| 201 | $260.42 | $52,343.75 | $323.15 | $64,953.15 | $70,736.77 | $77,209.56 | $ 92,605.23 | $101,754.29 | $112,049.04 | $136,730.21 | $168,208.02 | $208,530.95 | $117,296.90 |
| 202 | $260.42 | $52,604.17 | $323.15 | $65,276.30 | $71,119.14 | $77,661.93 | $ 93,238.14 | $102,502.76 | $112,934.05 | $137,967.04 | $169,935.59 | $210,942.64 | $117,880.47 |
| 203 | $260.42 | $52,864.58 | $323.15 | $65,599.45 | $71,501.83 | $78,115.05 | $ 93,873.16 | $103,254.35 | $113,823.48 | $139,212.13 | $171,677.57 | $213,378.45 | $118,464.03 |
| 204 | $260.42 | $53,125.00 | $323.15 | $65,922.60 | $71,884.83 | $78,568.93 | $ 94,510.30 | $104,009.07 | $114,717.37 | $140,465.51 | $173,434.06 | $215,838.62 | $119,047.60 |
| 205 | $260.42 | $53,385.42 | $323.15 | $66,245.75 | $72,268.15 | $79,023.57 | $ 95,149.56 | $104,766.94 | $115,615.72 | $141,727.26 | $175,205.18 | $218,323.38 | $119,631.17 |
| 206 | $260.42 | $53,645.83 | $323.15 | $66,568.90 | $72,651.80 | $79,478.97 | $ 95,790.95 | $105,527.97 | $116,518.56 | $142,997.41 | $176,991.07 | $220,833.00 | $120,214.73 |
| 207 | $260.42 | $53,906.25 | $323.15 | $66,892.05 | $73,035.76 | $79,935.12 | $ 96,434.48 | $106,292.16 | $117,425.92 | $144,276.03 | $178,791.84 | $223,367.71 | $120,798.30 |
| 208 | $260.42 | $54,166.67 | $323.15 | $67,215.20 | $73,420.04 | $80,392.03 | $ 97,080.16 | $107,059.54 | $118,337.82 | $145,563.17 | $180,607.61 | $225,927.77 | $121,381.87 |
| 209 | $260.42 | $54,427.08 | $323.15 | $67,538.35 | $73,804.64 | $80,849.71 | $ 97,727.98 | $107,830.12 | $119,254.27 | $146,858.90 | $182,438.52 | $228,513.43 | $121,965.43 |
| 210 | $260.42 | $54,687.50 | $323.15 | $67,861.50 | $74,189.57 | $81,308.15 | $ 98,377.97 | $108,603.91 | $120,175.31 | $148,163.26 | $184,284.68 | $231,124.94 | $122,549.00 |
| 211 | $260.42 | $54,947.92 | $323.15 | $68,184.65 | $74,574.81 | $81,767.35 | $ 99,030.12 | $109,380.92 | $121,100.95 | $149,476.32 | $186,146.23 | $233,762.57 | $123,132.57 |
| 212 | $260.42 | $55,208.33 | $323.15 | $68,507.80 | $74,960.38 | $82,227.32 | $ 99,684.45 | $110,161.17 | $122,031.22 | $150,798.13 | $188,023.29 | $236,426.58 | $123,716.13 |
| 213 | $260.42 | $55,468.75 | $323.15 | $68,830.95 | $75,346.26 | $82,688.05 | $100,340.96 | $110,944.67 | $122,966.14 | $152,128.76 | $189,916.00 | $239,117.23 | $124,299.70 |
| 214 | $260.42 | $55,729.17 | $323.15 | $69,154.10 | $75,732.47 | $83,149.55 | $100,999.66 | $111,731.44 | $123,905.74 | $153,468.26 | $191,824.47 | $241,834.78 | $124,883.27 |
| 215 | $260.42 | $55,989.58 | $323.15 | $69,477.25 | $76,119.00 | $83,611.82 | $101,660.55 | $112,521.48 | $124,850.03 | $154,816.68 | $193,748.85 | $244,579.51 | $125,466.83 |
| 216 | $260.42 | $56,250.00 | $323.15 | $69,800.40 | $76,505.85 | $84,074.86 | $102,323.65 | $113,314.82 | $125,799.05 | $156,174.10 | $195,689.27 | $247,351.69 | $126,050.40 |
| 217 | $260.42 | $56,510.42 | $323.15 | $70,123.55 | $76,893.03 | $84,538.68 | $102,988.95 | $114,111.46 | $126,752.81 | $157,540.56 | $197,645.86 | $250,151.59 | $126,633.97 |
| 218 | $260.42 | $56,770.83 | $323.15 | $70,446.70 | $77,280.52 | $85,003.26 | $103,656.47 | $114,911.42 | $127,711.34 | $158,916.14 | $199,618.75 | $252,979.48 | $127,217.53 |
| 219 | $260.42 | $57,031.25 | $323.15 | $70,769.85 | $77,668.34 | $85,468.62 | $104,326.22 | $115,714.72 | $128,674.66 | $160,300.88 | $201,608.08 | $255,835.66 | $127,801.10 |
| 220 | $260.42 | $57,291.67 | $323.15 | $71,093.00 | $78,056.49 | $85,934.76 | $104,998.20 | $116,521.36 | $129,642.80 | $161,694.86 | $203,613.99 | $258,720.40 | $128,384.67 |
| 221 | $260.42 | $57,552.08 | $323.15 | $71,416.15 | $78,444.95 | $86,401.67 | $105,672.43 | $117,331.36 | $130,615.78 | $163,098.13 | $205,636.62 | $261,633.98 | $128,968.23 |
| 222 | $260.42 | $57,812.50 | $323.15 | $71,739.30 | $78,833.74 | $86,869.37 | $106,348.89 | $118,144.74 | $131,593.63 | $164,510.75 | $207,676.10 | $264,576.71 | $129,551.80 |
| 223 | $260.42 | $58,072.92 | $323.15 | $72,062.45 | $79,222.86 | $87,337.84 | $107,027.62 | $118,961.50 | $132,576.36 | $165,932.80 | $209,732.58 | $267,548.85 | $130,135.37 |
| 224 | $260.42 | $58,333.33 | $323.15 | $72,385.60 | $79,612.29 | $87,807.09 | $107,708.60 | $119,781.67 | $133,564.01 | $167,364.32 | $211,806.19 | $270,550.72 | $130,718.93 |
| 225 | $260.42 | $58,593.75 | $323.15 | $72,708.75 | $80,002.06 | $88,277.12 | $108,391.86 | $120,605.26 | $134,556.59 | $168,805.39 | $213,897.08 | $273,582.61 | $131,302.50 |
| 226 | $260.42 | $58,854.17 | $323.15 | $73,031.90 | $80,392.15 | $88,747.94 | $109,077.39 | $121,432.28 | $135,554.14 | $170,256.06 | $216,005.40 | $276,644.82 | $131,886.07 |
| 227 | $260.42 | $59,114.58 | $323.15 | $73,355.05 | $80,782.56 | $89,219.54 | $109,765.21 | $122,262.74 | $136,556.68 | $171,716.41 | $218,131.29 | $279,737.65 | $132,469.63 |

PAYMENT TABLE

INVESTMENT PAYMENT CALCULATION

| | | |
|---|---|---|
| Conventional Loan Payment at 5.75% | | $583.57 |
| LESS: Interest Only Loan Payment at 3.125% | | $260.42 |
| Difference Applied to Investment | | $323.15 |

SYSTEMATIC INVESTMENT

| LOAN | $100,000 | | | | | | | | | | | | |
|---|---|---|---|---|---|---|---|---|---|---|---|---|---|
| RATE | 3.125% | | | | | | | | | | | | |
| INV AMT | $323.15 | | | | | | | | | | | | |

| | COST OF BORROWING | | | | | | | | | | | | |
|---|---|---|---|---|---|---|---|---|---|---|---|---|---|
| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
| 228 | $260.42 | $59,375.00 | $323.15 | $73,678.20 | $81,173.30 | $89,691.93 | $110,455.32 | $123,096.67 | $137,564.23 | $173,186.49 | $220,274.90 | $282,861.41 | $133,053.20 |
| 229 | $260.42 | $59,635.42 | $323.15 | $74,001.35 | $81,564.36 | $90,165.10 | $111,147.73 | $123,934.06 | $138,576.82 | $174,666.37 | $222,436.36 | $286,016.40 | $133,636.77 |
| 230 | $260.42 | $59,895.83 | $323.15 | $74,324.50 | $81,955.75 | $90,639.07 | $111,842.45 | $124,774.95 | $139,594.47 | $176,156.11 | $224,615.84 | $289,202.95 | $134,220.33 |
| 231 | $260.42 | $60,156.25 | $323.15 | $74,647.65 | $82,347.47 | $91,113.82 | $112,539.49 | $125,619.35 | $140,617.20 | $177,655.79 | $226,813.48 | $292,421.36 | $134,803.90 |
| 232 | $260.42 | $60,416.67 | $323.15 | $74,970.80 | $82,739.51 | $91,589.37 | $113,238.85 | $126,467.26 | $141,645.06 | $179,165.47 | $229,029.44 | $295,671.96 | $135,387.47 |
| 233 | $260.42 | $60,677.08 | $323.15 | $75,293.95 | $83,131.88 | $92,065.70 | $113,940.54 | $127,318.70 | $142,678.05 | $180,685.21 | $231,263.86 | $298,955.06 | $135,971.03 |
| 234 | $260.42 | $60,937.50 | $323.15 | $75,617.10 | $83,524.57 | $92,542.84 | $114,644.57 | $128,173.69 | $143,716.20 | $182,215.08 | $233,516.90 | $302,270.99 | $136,554.60 |
| 235 | $260.42 | $61,197.92 | $323.15 | $75,940.25 | $83,917.60 | $93,020.76 | $115,350.94 | $129,032.24 | $144,759.55 | $183,755.15 | $235,788.72 | $305,620.08 | $137,138.17 |
| 236 | $260.42 | $61,458.33 | $323.15 | $76,263.40 | $84,310.95 | $93,499.48 | $116,059.67 | $129,894.37 | $145,808.11 | $185,305.49 | $238,079.47 | $309,002.66 | $137,721.73 |
| 237 | $260.42 | $61,718.75 | $323.15 | $76,586.55 | $84,704.62 | $93,979.01 | $116,770.77 | $130,760.10 | $146,861.92 | $186,866.17 | $240,389.31 | $312,419.07 | $138,305.30 |
| 238 | $260.42 | $61,979.17 | $323.15 | $76,909.70 | $85,098.63 | $94,459.33 | $117,484.23 | $131,629.43 | $147,920.99 | $188,437.24 | $242,718.39 | $315,869.64 | $138,888.87 |
| 239 | $260.42 | $62,239.58 | $323.15 | $77,232.85 | $85,492.97 | $94,940.45 | $118,200.07 | $132,502.38 | $148,985.37 | $190,018.80 | $245,066.89 | $319,354.72 | $139,472.43 |
| 240 | $260.42 | $62,500.00 | $323.15 | $77,556.00 | $85,887.63 | $95,422.37 | $118,918.30 | $133,378.97 | $150,055.06 | $191,610.89 | $247,434.96 | $322,874.65 | $140,056.00 |
| 241 | $260.42 | $62,760.42 | $323.15 | $77,879.15 | $86,282.62 | $95,905.10 | $119,638.92 | $134,259.21 | $151,130.10 | $193,213.60 | $249,822.76 | $326,429.78 | $140,639.57 |
| 242 | $260.42 | $63,020.83 | $323.15 | $78,202.30 | $86,677.94 | $96,388.63 | $120,361.94 | $135,143.12 | $152,210.52 | $194,827.00 | $252,230.46 | $330,020.46 | $141,223.13 |
| 243 | $260.42 | $63,281.25 | $323.15 | $78,525.45 | $87,073.59 | $96,872.96 | $121,087.38 | $136,030.71 | $153,296.33 | $196,451.15 | $254,658.22 | $333,647.04 | $141,806.70 |
| 244 | $260.42 | $63,541.67 | $323.15 | $78,848.60 | $87,469.57 | $97,358.11 | $121,815.23 | $136,922.01 | $154,387.58 | $198,086.13 | $257,106.21 | $337,309.90 | $142,390.27 |
| 245 | $260.42 | $63,802.08 | $323.15 | $79,171.75 | $87,865.88 | $97,844.06 | $122,545.51 | $137,817.01 | $155,484.28 | $199,732.01 | $259,574.61 | $341,009.38 | $142,973.83 |
| 246 | $260.42 | $64,062.50 | $323.15 | $79,494.90 | $88,262.53 | $98,330.82 | $123,278.22 | $138,715.74 | $156,586.47 | $201,388.86 | $262,063.57 | $344,745.85 | $143,557.40 |
| 247 | $260.42 | $64,322.92 | $323.15 | $79,818.05 | $88,659.50 | $98,818.39 | $124,013.37 | $139,618.22 | $157,694.17 | $203,056.75 | $264,573.28 | $348,519.69 | $144,140.97 |
| 248 | $260.42 | $64,583.33 | $323.15 | $80,141.20 | $89,056.80 | $99,306.78 | $124,750.98 | $140,524.46 | $158,807.41 | $204,735.77 | $267,103.90 | $352,331.27 | $144,724.53 |
| 249 | $260.42 | $64,843.75 | $323.15 | $80,464.35 | $89,454.43 | $99,795.98 | $125,491.04 | $141,434.48 | $159,926.21 | $206,425.98 | $269,655.61 | $356,180.96 | $145,308.10 |
| 250 | $260.42 | $65,104.17 | $323.15 | $80,787.50 | $89,852.40 | $100,285.99 | $126,233.57 | $142,348.28 | $161,050.61 | $208,127.46 | $272,228.58 | $360,069.15 | $145,891.67 |
| 251 | $260.42 | $65,364.58 | $323.15 | $81,110.65 | $90,250.69 | $100,776.83 | $126,978.58 | $143,265.90 | $162,180.62 | $209,840.28 | $274,823.00 | $363,996.23 | $146,475.23 |
| 252 | $260.42 | $65,625.00 | $323.15 | $81,433.80 | $90,649.32 | $101,268.48 | $127,726.07 | $144,187.34 | $163,316.29 | $211,564.52 | $277,439.03 | $367,962.57 | $147,058.80 |
| 253 | $260.42 | $65,885.42 | $323.15 | $81,756.95 | $91,048.28 | $101,760.95 | $128,476.05 | $145,112.61 | $164,457.64 | $213,300.25 | $280,076.87 | $371,968.58 | $147,642.37 |
| 254 | $260.42 | $66,145.83 | $323.15 | $82,080.10 | $91,447.57 | $102,254.24 | $129,228.53 | $146,041.75 | $165,604.69 | $215,047.56 | $282,736.68 | $376,014.65 | $148,225.93 |
| 255 | $260.42 | $66,406.25 | $323.15 | $82,403.25 | $91,847.20 | $102,748.35 | $129,983.52 | $146,974.75 | $166,757.48 | $216,806.51 | $285,418.66 | $380,101.17 | $148,809.50 |
| 256 | $260.42 | $66,666.67 | $323.15 | $82,726.40 | $92,247.16 | $103,243.28 | $130,741.02 | $147,911.64 | $167,916.04 | $218,577.19 | $288,123.00 | $384,228.57 | $149,393.07 |
| 257 | $260.42 | $66,927.08 | $323.15 | $83,049.55 | $92,647.45 | $103,739.04 | $131,501.05 | $148,852.44 | $169,080.38 | $220,359.68 | $290,849.86 | $388,397.23 | $149,976.63 |
| 258 | $260.42 | $67,187.50 | $323.15 | $83,372.70 | $93,048.08 | $104,235.63 | $132,263.62 | $149,797.15 | $170,250.55 | $222,154.05 | $293,599.46 | $392,607.59 | $150,560.20 |
| 259 | $260.42 | $67,447.92 | $323.15 | $83,695.85 | $93,449.04 | $104,733.05 | $133,028.72 | $150,745.80 | $171,426.57 | $223,960.38 | $296,371.96 | $396,860.05 | $151,143.77 |
| 260 | $260.42 | $67,708.33 | $323.15 | $84,019.00 | $93,850.33 | $105,231.29 | $133,796.38 | $151,698.41 | $172,608.47 | $225,778.75 | $299,167.57 | $401,155.03 | $151,727.33 |
| 261 | $260.42 | $67,968.75 | $323.15 | $84,342.15 | $94,251.96 | $105,730.36 | $134,566.59 | $152,654.98 | $173,796.28 | $227,609.25 | $301,986.48 | $405,492.96 | $152,310.90 |
| 262 | $260.42 | $68,229.17 | $323.15 | $84,665.30 | $94,653.92 | $106,230.27 | $135,339.38 | $153,615.54 | $174,990.02 | $229,451.95 | $304,828.87 | $409,874.27 | $152,894.47 |
| 263 | $260.42 | $68,489.58 | $323.15 | $84,988.45 | $95,056.22 | $106,731.01 | $136,114.74 | $154,580.10 | $176,189.74 | $231,306.93 | $307,694.96 | $414,299.39 | $153,478.03 |
| 264 | $260.42 | $68,750.00 | $323.15 | $85,311.60 | $95,458.85 | $107,232.58 | $136,892.68 | $155,548.68 | $177,395.45 | $233,174.28 | $310,584.92 | $418,768.77 | $154,061.60 |
| 265 | $260.42 | $69,010.42 | $323.15 | $85,634.75 | $95,861.82 | $107,734.99 | $137,673.21 | $156,521.29 | $178,607.20 | $235,054.08 | $313,498.97 | $423,282.84 | $154,645.17 |

PAYMENT TABLE

| LOAN | $100,000 | | | | INVESTMENT PAYMENT CALCULATION | | | | | | | |
|---|---|---|---|---|---|---|---|---|---|---|---|---|
| RATE | 3.125% | | | | Conventional Loan Payment at 5.75% | | | $583.57 | | | | |
| INV | $323.15 | | | | LESS: Interest Only Loan Payment at 3.125% | | | $260.42 | | | | |
| AMT | | | | | Difference Applied to Investment | | | $323.15 | | | | |
| | COST OF BORROWING | | | | SYSTEMATIC INVESTMENT | | | | | | | |

| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
|---|---|---|---|---|---|---|---|---|---|---|---|---|---|
| 266 | $260.42 | $69,270.83 | $323.15 | $85,957.90 | $ 96,265.12 | $108,238.24 | $138,456.35 | $157,497.96 | $179,825.00 | $236,946.41 | $316,437.31 | $427,842.05 | $155,228.73 |
| 267 | $260.42 | $69,531.25 | $323.15 | $86,281.05 | $ 96,668.76 | $108,742.32 | $139,242.10 | $158,478.70 | $181,048.89 | $238,851.36 | $319,400.13 | $432,446.85 | $155,812.30 |
| 268 | $260.42 | $69,791.67 | $323.15 | $86,604.20 | $ 97,072.74 | $109,247.25 | $140,030.47 | $159,463.53 | $182,278.90 | $240,769.01 | $322,387.64 | $437,097.70 | $156,395.87 |
| 269 | $260.42 | $70,052.08 | $323.15 | $86,927.35 | $ 97,477.05 | $109,753.02 | $140,821.46 | $160,452.45 | $183,515.06 | $242,699.44 | $325,400.05 | $441,795.06 | $156,979.43 |
| 270 | $260.42 | $70,312.50 | $323.15 | $87,250.50 | $ 97,881.70 | $110,259.63 | $141,615.10 | $161,445.50 | $184,757.40 | $244,642.74 | $328,437.56 | $446,539.39 | $157,563.00 |
| 271 | $260.42 | $70,572.92 | $323.15 | $87,573.65 | $ 98,286.69 | $110,767.08 | $142,411.37 | $162,442.69 | $186,005.95 | $246,599.00 | $331,500.38 | $451,331.17 | $158,146.57 |
| 272 | $260.42 | $70,833.33 | $323.15 | $87,896.80 | $ 98,692.02 | $111,275.38 | $143,210.31 | $163,444.03 | $187,260.75 | $248,568.29 | $334,588.73 | $456,170.86 | $158,730.13 |
| 273 | $260.42 | $71,093.75 | $323.15 | $88,219.95 | $ 99,097.68 | $111,784.53 | $144,011.90 | $164,449.54 | $188,521.82 | $250,550.72 | $337,702.81 | $461,058.95 | $159,313.70 |
| 274 | $260.42 | $71,354.17 | $323.15 | $88,543.10 | $ 99,503.68 | $112,294.53 | $144,816.17 | $165,459.25 | $189,789.19 | $252,546.36 | $340,842.84 | $485,995.92 | $159,897.27 |
| 275 | $260.42 | $71,614.58 | $323.15 | $88,866.25 | $ 99,910.02 | $112,805.37 | $145,623.11 | $166,473.16 | $191,062.90 | $254,555.31 | $344,009.04 | $470,982.26 | $160,480.83 |
| 276 | $260.42 | $71,875.00 | $323.15 | $89,189.40 | $100,316.70 | $113,317.07 | $146,432.75 | $167,491.29 | $192,342.99 | $256,577.65 | $347,201.63 | $476,018.47 | $161,064.40 |
| 277 | $260.42 | $72,135.42 | $323.15 | $89,512.55 | $100,723.71 | $113,829.62 | $147,245.09 | $168,513.67 | $193,629.47 | $258,613.47 | $350,420.82 | $481,105.03 | $161,647.97 |
| 278 | $260.42 | $72,395.83 | $323.15 | $89,835.70 | $101,131.07 | $114,343.03 | $148,060.13 | $169,540.30 | $194,922.38 | $260,662.87 | $353,666.83 | $486,242.46 | $162,231.53 |
| 279 | $260.42 | $72,656.25 | $323.15 | $90,158.85 | $101,538.76 | $114,857.29 | $148,877.89 | $170,571.22 | $196,221.76 | $262,725.92 | $356,939.90 | $491,431.27 | $162,815.10 |
| 280 | $260.42 | $72,916.67 | $323.15 | $90,482.00 | $101,946.80 | $115,372.40 | $149,698.38 | $171,606.43 | $197,527.63 | $264,802.73 | $360,240.24 | $496,671.96 | $163,398.67 |
| 281 | $260.42 | $73,177.08 | $323.15 | $90,805.15 | $102,355.17 | $115,888.38 | $150,521.60 | $172,645.95 | $198,840.03 | $266,893.39 | $363,568.09 | $501,965.07 | $163,982.23 |
| 282 | $260.42 | $73,437.50 | $323.15 | $91,128.30 | $102,763.89 | $116,405.21 | $151,347.57 | $173,689.81 | $200,159.00 | $268,997.98 | $366,923.66 | $507,311.10 | $164,565.80 |
| 283 | $260.42 | $73,697.92 | $323.15 | $91,451.45 | $103,172.94 | $116,922.91 | $152,176.29 | $174,738.01 | $201,484.56 | $271,116.61 | $370,307.20 | $512,710.59 | $165,149.37 |
| 284 | $260.42 | $73,958.33 | $323.15 | $91,774.60 | $103,582.34 | $117,441.47 | $153,007.77 | $175,790.58 | $202,816.75 | $273,249.35 | $373,718.94 | $518,164.08 | $165,732.93 |
| 285 | $260.42 | $74,218.75 | $323.15 | $92,097.75 | $103,992.08 | $117,960.90 | $153,842.02 | $176,847.54 | $204,155.60 | $275,396.32 | $377,159.11 | $523,672.10 | $166,316.50 |
| 286 | $260.42 | $74,479.17 | $323.15 | $92,420.90 | $104,402.16 | $118,481.19 | $154,679.06 | $177,908.90 | $205,501.14 | $277,557.60 | $380,627.94 | $529,235.20 | $166,900.07 |
| 287 | $260.42 | $74,739.58 | $323.15 | $92,744.05 | $104,812.58 | $119,002.34 | $155,518.88 | $178,974.68 | $206,853.41 | $279,733.29 | $384,125.68 | $534,853.94 | $167,483.63 |
| 288 | $260.42 | $75,000.00 | $323.15 | $93,067.20 | $105,223.34 | $119,524.37 | $156,361.50 | $180,044.91 | $208,212.45 | $281,923.48 | $387,652.57 | $540,528.86 | $168,067.20 |
| 289 | $260.42 | $75,260.42 | $323.15 | $93,390.35 | $105,634.45 | $120,047.27 | $157,206.94 | $181,119.59 | $209,578.28 | $284,128.28 | $391,208.86 | $546,260.53 | $168,650.77 |
| 290 | $260.42 | $75,520.83 | $323.15 | $93,713.50 | $106,045.90 | $120,571.03 | $158,055.19 | $182,198.75 | $210,950.93 | $286,347.77 | $394,794.77 | $552,049.51 | $169,234.33 |
| 291 | $260.42 | $75,781.25 | $323.15 | $94,036.65 | $106,457.69 | $121,095.67 | $158,906.26 | $183,282.41 | $212,330.45 | $288,582.06 | $398,410.57 | $557,896.39 | $169,817.90 |
| 292 | $260.42 | $76,041.67 | $323.15 | $94,359.80 | $106,869.82 | $121,621.19 | $159,760.18 | $184,370.58 | $213,716.87 | $290,831.24 | $402,056.50 | $563,801.74 | $170,401.47 |
| 293 | $260.42 | $76,302.08 | $323.15 | $94,682.95 | $107,282.30 | $122,147.58 | $160,616.94 | $185,463.29 | $215,110.22 | $293,095.42 | $405,732.82 | $569,766.13 | $170,985.03 |
| 294 | $260.42 | $76,562.50 | $323.15 | $95,006.10 | $107,695.12 | $122,674.85 | $161,476.56 | $186,560.55 | $216,510.54 | $295,374.70 | $409,439.77 | $575,790.18 | $171,568.60 |
| 295 | $260.42 | $76,822.92 | $323.15 | $95,329.25 | $108,108.28 | $123,202.99 | $162,339.04 | $187,662.38 | $217,917.86 | $297,669.17 | $413,177.61 | $581,874.46 | $172,152.17 |
| 296 | $260.42 | $77,083.33 | $323.15 | $95,652.40 | $108,521.79 | $123,732.02 | $163,204.40 | $188,768.81 | $219,332.21 | $299,978.93 | $416,946.60 | $588,019.59 | $172,735.73 |
| 297 | $260.42 | $77,343.75 | $323.15 | $95,975.55 | $108,935.65 | $124,261.93 | $164,072.64 | $189,879.84 | $220,753.64 | $302,304.10 | $420,746.99 | $594,226.16 | $173,319.30 |
| 298 | $260.42 | $77,604.17 | $323.15 | $96,298.70 | $109,349.85 | $124,792.72 | $164,943.77 | $190,995.50 | $222,182.17 | $304,644.76 | $424,579.06 | $600,494.81 | $173,902.87 |
| 299 | $260.42 | $77,864.58 | $323.15 | $96,621.85 | $109,764.39 | $125,324.40 | $165,817.81 | $192,115.81 | $223,617.85 | $307,001.03 | $428,443.06 | $606,826.14 | $174,486.43 |
| 300 | $260.42 | $78,125.00 | $323.15 | $96,945.00 | $110,179.28 | $125,856.96 | $166,694.77 | $193,240.79 | $225,060.70 | $309,373.01 | $432,339.27 | $613,220.78 | $175,070.00 |
| 301 | $260.42 | $78,385.42 | $323.15 | $97,268.15 | $110,594.52 | $126,390.41 | $167,574.64 | $194,370.46 | $226,510.77 | $311,760.80 | $436,267.94 | $619,679.37 | $175,653.57 |
| 302 | $260.42 | $78,645.83 | $323.15 | $97,591.30 | $111,010.10 | $126,924.75 | $168,457.45 | $195,504.83 | $227,968.09 | $314,164.51 | $440,229.35 | $626,202.54 | $176,237.13 |
| 303 | $260.42 | $78,906.25 | $323.15 | $97,914.45 | $111,426.03 | $127,459.98 | $169,343.20 | $196,643.93 | $229,432.70 | $316,584.24 | $444,223.77 | $632,790.95 | $176,820.70 |

-continued

PAYMENT TABLE

| LOAN | $100,000 | | | INVESTMENT PAYMENT CALCULATION | | | | | | |
|---|---|---|---|---|---|---|---|---|---|---|
| RATE | 3.125% | | | Conventional Loan Payment at 5.75% | | | $583.57 | | | |
| INV | $323.15 | | | LESS: Interest Only Loan Payment at 3.125% | | | $260.42 | | | |
| AMT | | | | Difference Applied to Investment | | | $323.15 | | | |

| | COST OF BORROWING | | | | | SYSTEMATIC INVESTMENT | | | | | | |
|---|---|---|---|---|---|---|---|---|---|---|---|---|
| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
| 304 | $260.42 | $79,166.67 | $323.15 | $98,237.60 | $111,842.30 | $127,996.10 | $170,231.91 | $197,787.78 | $230,904.63 | $319,020.11 | $448,251.47 | $639,445.24 | $177,404.27 |
| 305 | $260.42 | $79,427.08 | $323.15 | $98,560.75 | $112,258.92 | $128,533.12 | $171,123.58 | $198,936.39 | $232,383.92 | $321,472.21 | $452,312.75 | $646,166.08 | $177,987.83 |
| 306 | $260.42 | $79,687.50 | $323.15 | $98,883.90 | $112,675.89 | $129,071.03 | $172,018.21 | $200,089.79 | $233,870.60 | $323,940.67 | $456,407.86 | $652,954.12 | $178,571.40 |
| 307 | $260.42 | $79,947.92 | $323.15 | $99,207.05 | $113,093.20 | $129,609.83 | $172,915.84 | $201,246.77 | $235,364.72 | $326,425.57 | $460,537.10 | $659,810.04 | $179,154.97 |
| 308 | $260.42 | $80,208.33 | $323.15 | $99,530.20 | $113,510.87 | $130,149.54 | $173,816.45 | $202,411.02 | $236,866.31 | $328,927.05 | $464,700.76 | $666,734.52 | $179,738.53 |
| 309 | $260.42 | $80,468.75 | $323.15 | $99,853.35 | $113,928.88 | $130,690.14 | $174,720.06 | $203,578.90 | $238,375.41 | $331,445.20 | $468,899.10 | $673,728.25 | $180,322.10 |
| 310 | $260.42 | $80,729.17 | $323.15 | $100,176.50 | $114,347.24 | $131,231.65 | $175,626.69 | $204,751.64 | $239,892.05 | $333,980.14 | $473,132.44 | $680,791.91 | $180,905.67 |
| 311 | $260.42 | $80,989.58 | $323.15 | $100,499.65 | $114,765.95 | $131,774.06 | $176,536.34 | $205,929.27 | $241,416.28 | $336,531.98 | $477,401.05 | $687,926.21 | $181,489.23 |
| 312 | $260.42 | $81,250.00 | $323.15 | $100,822.80 | $115,185.01 | $132,317.37 | $177,449.02 | $207,111.80 | $242,948.12 | $339,100.83 | $481,705.24 | $695,131.86 | $182,072.80 |
| 313 | $260.42 | $81,510.42 | $323.15 | $101,145.95 | $115,604.41 | $132,861.59 | $178,364.75 | $208,299.26 | $244,487.63 | $341,686.81 | $486,045.29 | $702,409.56 | $182,656.37 |
| 314 | $260.42 | $81,770.83 | $323.15 | $101,469.10 | $116,024.17 | $133,406.71 | $179,283.52 | $209,491.67 | $246,034.83 | $344,290.02 | $490,421.51 | $709,760.04 | $183,239.93 |
| 315 | $260.42 | $82,031.25 | $323.15 | $101,792.25 | $116,444.28 | $133,952.74 | $180,205.36 | $210,689.05 | $247,589.77 | $346,910.59 | $494,834.20 | $717,184.02 | $183,823.50 |
| 316 | $260.42 | $82,291.67 | $323.15 | $102,115.40 | $116,864.73 | $134,499.69 | $181,130.27 | $211,891.42 | $249,152.49 | $349,548.63 | $499,283.66 | $724,682.24 | $184,407.07 |
| 317 | $260.42 | $82,552.08 | $323.15 | $102,438.55 | $117,285.54 | $135,047.54 | $182,058.27 | $213,098.80 | $250,723.02 | $352,204.26 | $503,770.20 | $732,255.44 | $184,990.63 |
| 318 | $260.42 | $82,812.50 | $323.15 | $102,761.70 | $117,706.70 | $135,596.31 | $182,989.36 | $214,311.21 | $252,301.40 | $354,877.60 | $508,294.13 | $739,904.38 | $185,574.20 |
| 319 | $260.42 | $83,072.92 | $323.15 | $103,084.85 | $118,128.20 | $136,145.99 | $183,923.55 | $215,528.67 | $253,887.67 | $357,568.75 | $512,855.76 | $747,629.80 | $186,157.77 |
| 320 | $260.42 | $83,333.33 | $323.15 | $103,408.00 | $118,550.06 | $136,696.59 | $184,860.85 | $216,751.20 | $255,481.87 | $360,277.85 | $517,455.40 | $755,432.48 | $186,741.33 |
| 321 | $260.42 | $83,593.75 | $323.15 | $103,731.15 | $118,972.27 | $137,248.11 | $185,801.28 | $217,978.82 | $257,084.05 | $363,005.00 | $522,093.37 | $763,313.19 | $187,324.90 |
| 322 | $260.42 | $83,854.17 | $323.15 | $104,054.30 | $119,394.84 | $137,800.54 | $186,744.85 | $219,211.57 | $258,694.24 | $365,750.34 | $526,769.99 | $771,272.70 | $187,908.47 |
| 323 | $260.42 | $84,114.58 | $323.15 | $104,377.45 | $119,817.75 | $138,353.90 | $187,691.56 | $220,449.44 | $260,312.47 | $368,513.98 | $531,485.58 | $779,311.81 | $188,492.03 |
| 324 | $260.42 | $84,375.00 | $323.15 | $104,700.60 | $120,241.02 | $138,908.18 | $188,641.42 | $221,692.48 | $261,938.80 | $371,296.05 | $536,240.47 | $787,431.31 | $189,075.60 |
| 325 | $260.42 | $84,635.42 | $323.15 | $105,023.75 | $120,664.64 | $139,463.38 | $189,594.46 | $222,940.70 | $263,573.26 | $374,096.66 | $541,034.99 | $795,632.01 | $189,659.17 |
| 326 | $260.42 | $84,895.83 | $323.15 | $105,346.90 | $121,088.61 | $140,019.51 | $190,550.67 | $224,194.11 | $265,215.89 | $376,915.94 | $545,869.45 | $803,914.71 | $190,242.73 |
| 327 | $260.42 | $85,156.25 | $323.15 | $105,670.05 | $121,512.94 | $140,576.56 | $191,510.06 | $225,452.75 | $266,866.74 | $379,754.02 | $550,744.21 | $812,280.24 | $190,826.30 |
| 328 | $260.42 | $85,416.67 | $323.15 | $105,993.20 | $121,937.62 | $141,134.54 | $192,472.66 | $226,716.63 | $268,525.84 | $382,611.01 | $555,659.59 | $820,729.42 | $191,409.87 |
| 329 | $260.42 | $85,677.08 | $323.15 | $106,316.35 | $122,362.65 | $141,693.46 | $193,438.46 | $227,985.78 | $270,193.23 | $385,487.06 | $560,615.93 | $829,263.10 | $191,993.43 |
| 330 | $260.42 | $85,937.50 | $323.15 | $106,639.50 | $122,788.04 | $142,253.30 | $194,407.48 | $229,260.22 | $271,868.96 | $388,382.28 | $565,613.57 | $837,882.11 | $192,577.00 |
| 331 | $260.42 | $86,197.92 | $323.15 | $106,962.65 | $123,213.78 | $142,814.08 | $195,379.73 | $230,539.97 | $273,553.07 | $391,296.80 | $570,652.86 | $846,587.31 | $193,160.57 |
| 332 | $260.42 | $86,458.33 | $323.15 | $107,285.80 | $123,639.88 | $143,375.79 | $196,355.22 | $231,825.05 | $275,245.61 | $394,230.75 | $575,734.14 | $855,379.57 | $193,744.13 |
| 333 | $260.42 | $86,718.75 | $323.15 | $107,608.95 | $124,066.33 | $143,938.44 | $197,333.97 | $233,115.48 | $276,946.60 | $397,184.25 | $580,857.77 | $864,259.74 | $194,327.70 |
| 334 | $260.42 | $86,979.17 | $323.15 | $107,932.10 | $124,493.14 | $144,502.02 | $198,315.98 | $234,411.29 | $278,656.10 | $400,157.45 | $586,024.09 | $873,228.72 | $194,911.27 |
| 335 | $260.42 | $87,239.58 | $323.15 | $108,255.25 | $124,920.31 | $145,066.55 | $199,301.26 | $235,712.50 | $280,374.14 | $403,150.48 | $591,233.47 | $882,287.39 | $195,494.83 |
| 336 | $260.42 | $87,500.00 | $323.15 | $108,578.40 | $125,347.83 | $145,632.02 | $200,289.82 | $237,019.13 | $282,100.78 | $406,163.45 | $596,486.26 | $891,436.65 | $196,078.40 |
| 337 | $260.42 | $87,760.42 | $323.15 | $108,901.55 | $125,775.70 | $146,198.42 | $201,281.68 | $238,331.21 | $283,836.05 | $409,196.51 | $601,782.82 | $900,677.39 | $196,661.97 |
| 338 | $260.42 | $88,020.83 | $323.15 | $109,224.70 | $126,203.93 | $146,765.78 | $202,276.85 | $239,648.75 | $285,580.00 | $412,249.79 | $607,123.52 | $910,010.55 | $197,245.53 |
| 339 | $260.42 | $88,281.25 | $323.15 | $109,547.85 | $126,632.52 | $147,334.08 | $203,275.33 | $240,971.79 | $287,332.66 | $415,323.43 | $612,508.73 | $919,437.04 | $197,829.10 |
| 340 | $260.42 | $88,541.67 | $323.15 | $109,871.00 | $127,061.47 | $147,903.32 | $204,277.14 | $242,300.33 | $289,094.09 | $418,417.55 | $617,938.81 | $928,957.79 | $198,412.67 |
| 341 | $260.42 | $88,802.08 | $323.15 | $110,194.15 | $127,490.77 | $148,473.51 | $205,282.29 | $243,634.41 | $290,864.33 | $421,532.31 | $623,414.14 | $938,573.75 | $198,996.23 |

-continued

PAYMENT TABLE

INVESTMENT PAYMENT CALCULATION

| LOAN | $100,000 | | | | | | | | | | | |
|---|---|---|---|---|---|---|---|---|---|---|---|---|
| RATE | 3.125% | | | | Conventional Loan Payment at 5.75% | | | $583.57 | | | | |
| INV | $323.15 | | | | LESS: Interest Only Loan Payment at 3.125% | | | $260.42 | | | | |
| AMT | | | | | Difference Applied to Investment | | | $323.15 | | | | |

COST OF BORROWING | SYSTEMATIC INVESTMENT

| DATE | MINIMUM MONTHLY INTEREST PAYMENT | TOTAL INTEREST PAID | INV AMT | TOTAL INVESTMENT AMOUNT | 1% | 2% | 4% | 5% | 6% | 8% | 10% | 12% | TOTAL OUT OF POCKET COST |
|---|---|---|---|---|---|---|---|---|---|---|---|---|---|
| 342 | $260.42 | $89,062.50 | $323.15 | $110,517.30 | $127,920.43 | $149,044.66 | $206,290.80 | $244,974.05 | $292,643.42 | $424,667.83 | $628,935.10 | $ 948,285.87 | $199,579.80 |
| 343 | $260.42 | $89,322.92 | $323.15 | $110,840.45 | $128,350.45 | $149,616.76 | $207,302.66 | $246,319.27 | $294,431.40 | $427,824.25 | $634,502.07 | $ 958,095.11 | $200,163.37 |
| 344 | $260.42 | $89,583.33 | $323.15 | $111,163.60 | $128,780.83 | $150,189.81 | $208,317.89 | $247,670.10 | $296,228.32 | $431,001.72 | $640,115.43 | $ 968,002.44 | $200,746.93 |
| 345 | $260.42 | $89,843.75 | $323.15 | $111,486.75 | $129,211.57 | $150,763.81 | $209,336.51 | $249,026.56 | $298,034.23 | $434,200.37 | $645,775.57 | $ 978,008.85 | $201,330.50 |
| 346 | $260.42 | $90,104.17 | $323.15 | $111,809.90 | $129,642.66 | $151,338.77 | $210,358.53 | $250,388.66 | $299,849.16 | $437,420.34 | $651,482.87 | $ 988,115.32 | $201,914.07 |
| 347 | $260.42 | $90,364.58 | $323.15 | $112,133.05 | $130,074.12 | $151,914.69 | $211,383.95 | $251,756.45 | $301,673.18 | $440,661.78 | $657,237.74 | $ 998,322.85 | $202,497.63 |
| 348 | $260.42 | $90,625.00 | $323.15 | $112,456.20 | $130,505.93 | $152,491.57 | $212,412.79 | $253,129.93 | $303,506.31 | $443,924.83 | $663,040.57 | $1,008,632.46 | $203,081.20 |
| 349 | $260.42 | $90,885.42 | $323.15 | $112,779.35 | $130,938.11 | $153,069.41 | $213,445.06 | $254,509.13 | $305,348.61 | $447,209.63 | $668,891.75 | $1,019,045.17 | $203,664.77 |
| 350 | $260.42 | $91,145.83 | $323.15 | $113,102.50 | $131,370.64 | $153,648.22 | $214,480.77 | $255,894.08 | $307,200.11 | $450,516.34 | $674,791.69 | $1,029,562.00 | $204,248.33 |
| 351 | $260.42 | $91,406.25 | $323.15 | $113,425.65 | $131,803.54 | $154,227.99 | $215,519.94 | $257,284.80 | $309,060.88 | $453,845.08 | $680,740.79 | $1,040,184.00 | $204,831.90 |
| 352 | $260.42 | $91,666.67 | $323.15 | $113,748.80 | $132,236.79 | $154,808.72 | $216,562.56 | $258,681.32 | $310,930.95 | $457,196.02 | $686,739.48 | $1,050,912.22 | $205,415.47 |
| 353 | $260.42 | $91,927.08 | $323.15 | $114,071.95 | $132,670.41 | $155,390.42 | $217,608.67 | $260,083.66 | $312,810.37 | $460,569.30 | $692,788.15 | $1,061,747.73 | $205,999.03 |
| 354 | $260.42 | $92,187.50 | $323.15 | $114,395.10 | $133,104.39 | $155,973.10 | $218,658.25 | $261,491.83 | $314,699.19 | $463,965.06 | $698,887.23 | $1,072,691.58 | $206,582.60 |
| 355 | $260.42 | $92,447.92 | $323.15 | $114,718.25 | $133,538.73 | $156,556.74 | $219,711.34 | $262,905.88 | $316,597.45 | $467,383.47 | $705,037.13 | $1,083,744.88 | $207,166.17 |
| 356 | $260.42 | $92,708.33 | $323.15 | $115,041.40 | $133,973.43 | $157,141.36 | $220,767.94 | $264,325.82 | $318,505.20 | $470,824.66 | $711,238.28 | $1,094,908.71 | $207,749.73 |
| 357 | $260.42 | $92,968.75 | $323.15 | $115,364.55 | $134,408.49 | $157,726.95 | $221,828.06 | $265,751.67 | $320,422.50 | $474,288.80 | $717,491.11 | $1,106,184.18 | $208,333.30 |
| 358 | $260.42 | $93,229.17 | $323.15 | $115,687.70 | $134,843.92 | $158,313.51 | $222,891.72 | $267,183.47 | $322,349.37 | $477,776.03 | $723,796.05 | $1,117,572.40 | $208,916.87 |
| 359 | $260.42 | $93,489.58 | $323.15 | $116,010.85 | $135,279.71 | $158,901.06 | $223,958.92 | $268,621.23 | $324,285.89 | $481,286.51 | $730,153.52 | $1,129,074.51 | $209,500.43 |
| 360 | $260.42 | $93,750.00 | $323.15 | $116,334.00 | $135,715.86 | $159,489.58 | $225,029.67 | $270,064.98 | $326,232.08 | $484,820.39 | $736,563.98 | $1,140,691.64 | $210,084.00 |

The system using the Payment Table illustrates the opportunity to payoff a loan in a period of time less than that of a conventional loan. The acceleration is demonstrated by showing the principal value increasing to an amount greater than or equal to the original loan amount as demonstrated by the values shown in bold. For example, at a 12% rate of return, this occurs at month number 141. As can be seen, the system lowers the cost of the loan or reduces the total out of pocket cost to a level below the face amount of the loan according to the rate of return on the investment.

The row in the Payment Table corresponding with the date of the 250th month will be used further to illustrate the effect of reducing the cost of the loan. When the investment value reaches the loan amount and the total out of pocket costs exceed the investment value, the difference divided by the number of years to reach the stated loan value equals the net annual cost of the loan. The net annual cost divided by the loan amount equals the real annual percentage rate of the loan. The total out of pocket cost in this example equals $145,891.67. The systematic investment value earning a rate of 2% for 250 months equals $100,285.99. The difference equals a net cost of $45,605.68 to carry this loan for 250 months. The net interest rate of the loan can be calculated by taking the difference of $45,605.68 and dividing it by 250 months. This produces the cost per month of the loan equal to $182.42. The monthly cost multiplied by 12 months equals $2,189.07 of net annual interest expense. The net annual rate of interest paid divided by the original loan amount of $100,000.00 determines the net rate charged on the loan. As shown, the system reduced the net rate of interest charged on the loan from 3.125% to 2.19% for 250 months. Hence, the system reduces the time required to payoff the loan in this example from a conventional loan period of 360 months down to 250 months. This savings can be calculated by the total monthly payment of $583.57 multiplied by the 110 month period eliminated in the acceleration process. Using the system the consumer saves $64,192.70 with the same payment amount as a conventional loan.

The Payment Table also illustrates the payoff scenario in which the total out of pocket cost equals a sum less than the face amount of the loan. (See Example 1 below.) For example, the row for the 168th month in Payment Table compares a 5.75% conventional loan payment with an interest only loan rate of 3.125% and shows the total out of pocket cost equals $98,039.20. The investment value earning 8% for 168 months equals $100,201.08. This amount sufficiently pays off the original loan of $100,000.00. The difference between the time periods to payoff the loan results in an additional savings of 192 months (360 months minus 168 months). The amount of savings realized is calculated by taking the 192 months multiplied by the monthly payment of $583.57. The savings realized by using the system equals $112,045.44. Example 1 illustrates this scenario where the borrow's out of pocket costs are less than the loan amount.

EXAMPLE 1

| | |
|---|---|
| Total Interest Paid on Interest Only Loan | $ 43,750.00 |
| Plus: Total Investment Payments | $ 54,289.20 |
| Total Out of Pocket Cost | $ 98,039.20 |
| Original Loan Value | $100,000.00 |
| Less: Total Out of Pocket Cost | $ 98,039.20 |
| Amount Paid Under the Original Loan Value | $ 1,960.80 |

Another benefit of the present invention is its ability to generate income. (See Example 2 below.) Many individuals spend years paying off traditional mortgages. They are then faced to rely on retirement benefits and, or meager savings accumulated for income needs. The cost of goods and services continue to rise due to the effects of inflation. The rising prices challenge consumers who are not able to meet the expected standard of living increases. The present invention can also be used to generate immediate income from existing equity in a property. The system can extract equity from a property and require making just the interest only loan payment. The cash out refinance creates principal that can be used to invest for income. The difference between the investment income and the mortgage interest rate is positive cash flow. The property value continues to increase in value based upon the housing market appreciation. In addition, the ability to generate income and/or take withdrawals from the investment provides additional security to the borrower and/or lender to lessen the risk of default. Example 2 illustrates this income generating potential.

EXAMPLE 2

| | |
|---|---|
| Property Value | $125,000.00 |
| Less: Outstanding Loans | $        0.00 |
| Total Equity | $125,000.00 |
| Loan Amount at | $100,000.00 |
| 80% Loan to Value | |
| Amount Available for Investment | $100,000.00 |
| Multiplied by: | |
| Rate of Return of 6% | 6% |
| Annual Income Invested at 6% | $   6,000.00 |
| Annual Income at 6% | $   6,000.00 |
| Less: Annual Cost of Interest | |
| Only Loan at 3.125% | ($  3,125.04) |
| Positive Annual Cash Flow | $   2,874.96 |
| Or Monthly Positive Cash Flow | $      239.58 |

Another benefit of the present invention is its ability to accumulate wealth. The accumulation of wealth can be illustrated by using the Payment Table in the row corresponding with the 360th month. Using the system for thirty years allows the principal to accumulate at a rate of 6%, which as illustrated within the Payment Table would equal $326,232.08. The remaining investment value after deducting the $100,000.00 loan amount equals $226,232.08. The value that accumulates depends on the interest rate earned, the time period, and the amount of the systematic payments that are made to the investment. As the investment value equals or exceeds the loan balance the difference equals an investment sum that can be used to achieve any additional financial goal.

Moreover, the present invention can actually make mortgage payments self funding or self sustaining. The system becomes self sustaining when the investment value grows to a level where the interest earned on the investment exceeds the payment of the interest only loan. This can also be illustrated using the Payment Table. To find the value needed to achieve an income that will pay the interest only loan payment divide the amount of the annual interest charged on the interest only loan by the rate the investment accumulates. In this illustration the annual interest only loan payment of $3,125.00 divided by a 5% investment rate equals $62,500.00 of investment needed to achieve a self sustaining payment. The row corresponding to the 142nd month and the column representing the 5% rate of interest illustrate the ability to create a self sustaining payment. The investment value corresponding to the rate of 5% for 142 months equals $62, 675.41. The investment value of $62,675.41 earning 5% generates $3,133.77 per year. The earnings are sufficient to pay the interest only payment. Any amount of earnings on the investment at a higher interest rate will allow the investment to continue to accumulate. If the earnings occur at a lower rate on the same principal amount the investment value will be reduced.

The present invention also offers the consumer the flexibility to draw the interest only payment from the value of the investment. If a hardship should result the interest only loan payments can be withdrawn from the investment value. The investment value combined with the property value helps protect the consumer and lending institution from the risk of default.

Yet another benefit of the present invention is its ability to allow for a borrower to make the minimum payment to achieve the maximum affordable house. Many circumstances make the accumulation of principal or the elimination of debt less important than only paying an interest only payment. A short time horizon for borrowing money, having a lump sum of principal to invest, or a financial hardship could be reasons systematic payments are not made towards the investment. The interest only loan payment can be the minimum payment required.

The maximum amount of the loan can be increased to a level dictated by a debt to income ratio with the reduced payment of the present invention. The maximum loan amount can be determined by taking the eligible annual loan payment that can be afforded and dividing it by the interest rate of the interest only loan. To illustrate the maximum loan amount concept compare a conventional loan amount of $100,000.00 at a 5.75% fixed interest rate for thirty years with the present invention. The conventional loan payment equals $583.57 per month of principal and interest. The annual loan payment amount equals $7,002.84. The annual payment divided by the interest only loan rate of 3.125% equals a maximum loan amount of $224,090.88. With the same monthly payment the system affords an additional $124,090.88 of loan value over a conventional loan. This scenario could be a prudent solution for a consumer with a lump sum to invest. The lump sum reduces or eliminates the need to add systematic investments to payoff the loan. The lump sum could come from equity in a current property. Once the property is sold the equity could be invested to accumulate with the goal of paying off the loan in the future. Even if the economic conditions change and a reduction in the payment is required the principal from the investment can be applied to reduce the monthly payment. Short term financing is another situation that the maximum loan value concept would be a prudent solution. The larger loan value affords a home of higher value. The consumer continues to profit from the rise in equity value based on local housing market increases. In comparison the amount of principal reduction with a conventional loan during short time periods would be nominal. The value gained by affording a home of larger value can offset the nominal principal reduction of a conventional loan.

Hence, the present invention offers the flexibility of reducing the monthly payment. The amount allocated to accumulate in the investment component can be decreased to reduce the loan balance. The smaller loan balance results in a smaller monthly interest payment. The minimum payment can also be reduced by applying a lump sum payment or systematic amount towards the principal balance of the loan. The period of time to payoff the loan balance is extended if the lump sum or systematic amount is withdrawn from the investment.

Additionally, the present invention allows institutions to place a security interest or other restrictions on the additional collateral. Also, the financial institution may offer and/or require sound investment choices and may earn fee income on the interest only loan component as well as fee income generated from the investment deposits, the growth thereof, or the management of the investments.

Although it is envisioned that the primary application of the present invention will be in the mortgage market, it can be used equally as well in other lending/investment scenarios, particularly those involving static or appreciating collateral or long investment/loan time periods. Finally, while many of the benefits of the present invention have been described and illustrated herein, other benefits and advantages of the present invention, particularly in scenarios and relationships not specifically discussed or illustrated herein, may be readily recognized from the Payment Table and the relationship of the values illustrated therein.

While the present invention has been illustrated by description of various embodiments and while these embodiments have been described in considerable detail, it is not the intention of the applicant to restrict or in any way limit the scope of the claims to such detail. Additional advantages and modifications will readily appear to those skilled in the art. The invention in its broader aspect is, therefore, not limited to the specific details, representative system, apparatus, and method, and illustrative example shown and described. Accordingly, departures may be made from such details without departing from the spirit or scope of the applicant's general inventive concept.

What is claimed is:

1. A method for establishing a combined collateral loan and investment system which accelerates paying off a mortgage and simultaneously generating wealth for a living mortgagor via an investment account, the mortgage having a term, the collateral loan having tangible collateral, the method using loan amortization parameters to perform a comparative analysis, comprising the steps of:

calculating, by a computer processor, a conventional loan payment for a given conventional loan amount at a given conventional rate and a given term, the conventional loan payment comprising a conventional interest payment and a conventional principle payment;

determining, by the computer processor, a maximum interest only loan amount for a given interest only rate and the given term at an interest only payment equaling the conventional loan payment, the maximum interest only loan amount not being greater than a given loan to value of the tangible collateral ratio;

comparing, by the computer processor, the conventional loan amount with the interest only loan amount;

determining, by the computer processor, an amount of the interest only loan amount that is greater than the conventional loan amount for allocation as an initial lump sum for the investment account;

calculating, by the computer processor, a loan payment at the given interest only rate and the given term for an amount equal to the given conventional loan amount and the initial lump sum;

determining, by the computer processor, an amount of the conventional loan payment that is greater than the amount of the loan payment, the amount of the conventional loan payment that is greater being the amount for systematic and fixed deposits to the investment account;

receiving, by a mortgagee, a plurality of systematic and fixed payments over the given term from the living mortgagor, the amount of each of the plurality of systematic and fixed payments equaling the conventional loan payment;

dividing, by the mortgagee, the systematic and fixed payment into a first portion and a second portion, the first portion being equal to the amount of the second interest only loan payment, and the second portion being equal to the amount of the systematic and fixed deposits to the investment account;

applying, by the mortgagee, the first portion of the systematic and fixed payment to satisfy the interest due on the mortgage;

applying, by the mortgagee, the second portion of the systematic and fixed payment to the investment account;

applying, by the mortgagee, an amount received that is greater than the systematic and fixed payment and that is designated for the investment account to the investment account and an amount that is greater than the systematic and fixed payment that is designated to reduce the mortgage principle to the mortgage;

allowing the investment account to grow over time; and applying a portion of the investment account to satisfy the mortgage.

2. The method of claim 1 further comprising the step of allowing the investment account to compound.

3. The method of claim 1 further comprising the step of placing restrictions on the investment account.

4. The method of claim 1 further comprising the step of granting a security interest in the investment account to the mortgagee.

5. The method of claim 1 further comprising the step of granting a security interest in the investment account to a private mortgage insurer.

6. The method of claim 1 further comprising the step of granting a security interest in the investment account to a second mortgagee.

7. The method of claim 1 further comprising the step of applying a portion of the investment account to satisfy the mortgage at a time after which the value of the investment account exceeds the mortgage but prior to the expiration of the mortgage.

8. The method of claim 1 further comprising the step of providing a portion of the growth of the investment account to the mortgagee.

9. The method of claim 1 further comprising the step of providing a portion of the growth of the investment account to an investment account manager.

10. The method of claim 1 further comprising the step of withdrawing a portion of the investment account to satisfy the interest due on the mortgage.

11. The method of claim 10 further comprising the step of waiting until the interest earned on the investment account for a particular period exceeds the systematic and fixed payment for that same period before withdrawing a portion of the investment account to pay the interest due on the mortgage.

12. A method for establishing a combined collateral loan and investment system which accelerates paying off a mortgage and simultaneously generating wealth for a living mortgagor via an investment account, the mortgage having a term, the collateral loan having tangible collateral, the method using loan amortization parameters to perform a comparative analysis, comprising the steps of:

calculating, by a computer processor, a conventional loan payment for a given conventional loan amount at a given conventional rate and a given term, the conventional loan payment comprising a conventional interest payment and a conventional principle payment;

determining, by the computer processor, a maximum interest only loan amount for a given interest only rate and the given term at an interest only payment equaling the conventional loan payment, the maximum interest only loan amount not being greater than a given loan to value of the tangible collateral ratio;

comparing, by the computer processor, the conventional loan amount with the interest only loan amount;

determining, by the computer processor, an amount of the interest only loan amount that is greater than the conventional loan amount for allocation as an initial lump sum for the investment account;

calculating, by the computer processor, a loan payment at the given interest only rate and the given term for an amount equal to the given conventional loan amount and the initial lump sum;

determining, by the computer processor, an amount of the conventional loan payment that is greater than the amount of the loan payment, the amount of the conventional loan payment that is greater being the amount for systematic and fixed deposits to the investment account;

using, by the living mortgagor, loan amortization parameters to perform a comparative analysis between a traditional amortized loan and the combined collateral loan and investment system;

depositing, by the living mortgagor, in the investment account an amount equal to the initial lump sum;

making, by the living mortgagor, a plurality of systematic and fixed payments over the given term to a mortgagee, the amount of each of the plurality of systematic and fixed payments equaling the conventional loan payment, the systematic and fixed payment having a first portion and a second portion, the first portion being equal to the amount of the loan payment, and the second portion being equal to the amount of the systematic and fixed deposits to the investment account, the first portion of the systematic and fixed payment being allocated to satisfy the interest due on the mortgage and the second portion of the systematic and fixed payment being allocated to the investment account;

determining, by the living mortgagor, whether to deposit into the investment account any funds beyond the initial deposit and the second portion of the systematic and fixed payment;

determining, by the living mortgagor, whether to deposit any funds to reduce the mortgage;

allowing the investment account to compound over time; and applying a portion of the investment account to satisfy the mortgage.

13. The method of claim 12 further comprising the step of granting a security interest in the investment account to the mortgagee.

14. The method of claim 12 further comprising the step of granting a security interest in the investment account to a private mortgage insurer.

15. The method of claim 12 further comprising the step of granting a security interest in the investment account to a second mortgagee.

16. The method of claim 12 further comprising the step of applying a portion of the investment account to satisfy the mortgage after the value of the investment account exceeds the mortgage.

17. The method of claim 16 further comprising the step of applying a portion of the investment account to satisfy the mortgage prior to the expiration of the mortgage.

18. The method of claim 12 fresher comprising the step of withdrawing a portion of the investment account to satisfy the interest due on the mortgage.

19. The method of claim 18 further comprising the step of waiting until the interest earned on the investment account for a particular period exceeds the systematic and fixed payment for that sane period before withdrawing a portion of the investment account to pay the interest due on the mortgage.

20. A method for selecting a mortgage comprising:
determining the traditional amortization parameters for a conventional loan including specifying a desired amount of the conventional loan, specifying a desired term, determining a current interest rate that is available for the desired amount of the conventional loan and the desired term, specifying a number of plurality of traditional payments over the desired term, and calculating, by a computer processor, an amount for each of the plurality of traditional payments;
determining interest only mortgage amortization parameters for the desired amount of the conventional loan including determining a current interest only rate for an interest only loan for the desired amount of the conventional loan for the desired term and calculating, by a computer processor, an amount for each of the plurality of interest only payments for the interest only loan;
determining, by the computer processor, a maximum interest only loan amount at the interest only rate and for the desired term when the interest only payment equals the traditional payment;
determining, by the computer processor, an amount of the interest only loan amount that is greater than the amount of the conventional loan for allocation as an initial lump sum investment;
determining the difference in the amount of each of the traditional payments and the amount of each of the interest only payments;
comparing, by the computer processor, the growth of the difference in the traditional payments and the interest only payments if the difference is invested at various given rates of return and over various given periods of time and given any initial lump sum investment;
evaluating various investment vehicles currently available to satisfy a mortgagor's specified time to pay off the mortgage and the mortgagee's specified level of protection in the investment; and
selecting the mortgage that meets the specifications of the mortgagee and the mortgagor.

21. The method of claim 20 further comprising:
calculating, by the computer processor, a loan payment at the interest only rate and the desired term for an amount equal to the amount of the conventional loan and the initial lump sum investment; and
determining, by the computer processor, an amount of the traditional loan payment that is greater than the amount of the loan payment, the amount of the traditional loan payment that is greater being the amount for systematic and fixed deposits to the investment.

* * * * *

UNITED STATES PATENT AND TRADEMARK OFFICE
CERTIFICATE OF CORRECTION

| | |
|---|---|
| PATENT NO. | : 7,603,305 B2 |
| APPLICATION NO. | : 11/186613 |
| DATED | : October 13, 2009 |
| INVENTOR(S) | : Richard T. Combs |

It is certified that error appears in the above-identified patent and that said Letters Patent is hereby corrected as shown below:

Cover page, Column 2, Item (74), "Wood, Herron & Evans" should be -- Wood, Herron & Evans, L.L.P. --

Column 1, line 24 "The number of ... increase annually." should be -- The number of ... increases annually --

Column 3, line 44 "...consumers goal." should be -- consumer's goal --

Column 3, line 45 "...or systematic withdraws to be used..." should be -- or systematic withdrawals to be used --

Column 3, line 67 to Column 4, line 1 "The availability of ... offer flexibility and gives..." should be -- The availability of ... offers flexibility and gives... --

Column 4, lines 35-36 "...investments or withdraws for..." should be -- ...investments or withdrawals for... --

Column 4, line 41 "...systematic withdraw, ..." should be -- ...systematic withdrawals, ... --

Column 4, lines 53-54 "...or withdraw activity..." should be -- ...or withdrawal activity... --

Column 5, line 35 "...the investments goals a consumer." should be -- ...the investment goals of a consumer --

Columns 15 through 27 contain spreadsheets entitled "PAYMENT TABLE" and certain figures appearing in the table should be bold print as more specifically described below:

Line No. 142 of the Payment Table, appearing in Column 16, under the Payment Table column identified as 5% "$62,675.41" -- $62,675.41 --

Signed and Sealed this
Twenty-first Day of February, 2012

David J. Kappos
*Director of the United States Patent and Trademark Office*

CERTIFICATE OF CORRECTION (continued)
U.S. Pat. No. 7,603,305 B2

Line No. 168 of the Payment Table, appearing centered between Columns 17 and 18, under the Payment Table column identified as 8% "$100,201.08" -- $100,201.08 --

Line No. 168 of the Payment Table, appearing centered between Columns 17 and 18, under the Payment Table column identified as Total Out of Pocket Cost "$98,039.20" -- $98,039.20 --

Line No. 250 of the Payment Table, appearing in Column 22, under the Payment Table column identified as 2% "$100,285.99" -- $100,285.99 --

Line No. 250 of the Payment Table, appearing in Column 22, under the Payment Table column identified as Total Out of Pocket Cost "$145,891.67" -- $145,891.67 --

Column 29, line 30 "...required to payoff the loan..." should be -- ...required to pay off the loan... --

Column 29, line 46 "...time periods to payoff the loan..." should be -- ...time periods to pay off the loan... --

Column 29, line 51 "...where the borrow's out of pocket..." to --...where the borrower's out of pocket... --

Column 29, line 67 through Column 30, line 1 "...are then faced to rely on..." should be -- ... are then forced to rely on... --

Column 31, line 42 "...to payoff the loan." should be -- ...to pay off the loan --

Column 31, line 64 "...of time to payoff the loan balance..." should be -- ...of time to pay off the loan balance... --

Claim 1, Column 32, line 41 "...a conventional principle payment;" should be -- ...a conventional principal payment; --

Claim 1, Column 33, line 17 "...principle to the mortgage;" should be -- ...principal to the mortgage; --

Claim 12, Column 33, line 64 "...conventional principle payment;" should be -- ...conventional principal payment; --

Claim 18, Column 34, line 64 "The method of claim 12 fresher comprising..." should be -- The method of claim 12 further comprising... --

Claim 19, Column 35, line 4 "...for that sane period before..." should be -- ...for that same period before... --